United States Patent
Awfi

(10) Patent No.: US 11,378,705 B2
(45) Date of Patent: Jul. 5, 2022

(54) GENETIC QUALITY OF PICK ATTRIBUTE FOR SEISMIC CUBES AND SURFACES

(71) Applicant: Saudi Arabian Oil Company, Dhahran (SA)

(72) Inventor: Sami N. Awfi, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 733 days.

(21) Appl. No.: 16/273,540

(22) Filed: Feb. 12, 2019

(65) Prior Publication Data

US 2020/0257011 A1    Aug. 13, 2020

(51) Int. Cl.
     *G01V 1/30*      (2006.01)
     *G01V 1/34*      (2006.01)
     *G01V 1/36*      (2006.01)

(52) U.S. Cl.
     CPC .............. *G01V 1/302* (2013.01); *G01V 1/306* (2013.01); *G01V 1/345* (2013.01); *G01V 1/362* (2013.01); *G01V 2210/43* (2013.01); *G01V 2210/63* (2013.01); *G01V 2210/64* (2013.01); *G01V 2210/643* (2013.01)

(58) Field of Classification Search
CPC .... G01V 1/301; G01V 1/345; G01V 2210/63; G01V 2210/66; G01V 1/28; G01V 1/30; G01V 1/306; G01V 1/34; G01V 1/282; G01V 1/288; G01V 1/302; G01V 1/307; G01V 2210/64; G01V 2210/643; G01V 1/32; G01V 11/00; G01V 2210/48; G01V 1/303; G01V 1/362; G01V 99/005; G01V 1/48; G01V 2210/43; G01V 1/40; G01V 1/50; G01V 2210/65; G01V 2210/665; G06N 3/126; G06F 30/20

See application file for complete search history.

(56) References Cited

U.S. PATENT DOCUMENTS 6,131,071 A * 10/2000 Partyka .................. G01V 1/301
                                                                       702/16
7,519,476 B1 * 4/2009 Tnacheri .................. G01V 1/30
                                                                       702/11

(Continued)

OTHER PUBLICATIONS

Brown, "Seismic attributes and their classification," The Leading Edge, vol. 15, Issue 10, Oct. 1996, 1 page.

(Continued)

*Primary Examiner* — Yoshihisa Ishizuka
*Assistant Examiner* — Carter W Ferrell
(74) *Attorney, Agent, or Firm* — Fish & Richardson P.C.

(57) ABSTRACT

Methods, systems, and apparatus, including computer programs encoded on a computer storage medium, to generate a custom seismic surface and volume attribute. In one aspect, a method includes receiving a seismic cube and a seismic surface, and the seismic cube includes traces recorded at receivers deployed to collect seismic data. The seismic surface is picked on the seismic cube. Seismic wavelets are extracted with a selected length from the seismic cube along an intersection with the seismic surface for each spatial coordinate associated with the seismic surface. A reference wavelet is determined. A surface attribute map is generated based on comparing each of the seismic wavelets to the reference wavelet. A productivity of the seismic surface is evaluated using the surface attribute map.

15 Claims, 19 Drawing Sheets

(56) References Cited

U.S. PATENT DOCUMENTS

| | | | |
|---|---|---|---|
| 2012/0090834 A1 | 4/2012 | Imhof et al. | |
| 2012/0150447 A1* | 6/2012 | Van Hoek | G01V 1/301 |
| | | | 702/13 |
| 2013/0338927 A1 | 12/2013 | Kumaran | |
| 2016/0377753 A1 | 12/2016 | Paiva et al. | |
| 2018/0003839 A1 | 1/2018 | Lowell et al. | |
| 2018/0031732 A1 | 2/2018 | Mosse et al. | |
| 2018/0052249 A1 | 2/2018 | Chen et al. | |
| 2018/0113235 A1 | 4/2018 | Laverne | |
| 2018/0156937 A1 | 6/2018 | Wyatt et al. | |
| 2020/0301036 A1* | 9/2020 | Ramfjord | G01V 99/00 |

OTHER PUBLICATIONS

Chopra and Marfurt, "Emerging and future trends in seismic attributes," The Leading Edge, vol. 27, Issue 3, Mar. 2008, 16 pages.

Chopra and Marfurt, "Seismic attributes—A historical perspective," Geophysics vol. 70, Issue 5, Sep.-Oct. 2005, 26 pages.

Dirstein et al., "Insights from the automated extraction of surfaces from the bunda 3D seismic survey," West Australian Basins Symposium, Aug. 18, 2013, 21 pages.

PCT International Search Report and Written Opinion in International Appln. No. PCT/US2020/017488, dated Jun. 2, 2020, 18 pages.

Gramstad et al., "Seismic surface extraction using iterative Seismic DNA detection," SEG Las Vegas 2012 Annual Meeting, 2012, 5 pages.

Hoyes and Cheret, "A review of global interpretation methods for automated 3D horizon picking," Special Section: Reservoir Characterization, The Leading Edge, Jan. 2011, 8 pages.

Pauget et al., "A Global Approach in Seismic Interpretation Based on Cost Function Minimization," SEG Houston 2009 International Exposition and Annual Meeting, 2009, 5 pages.

Yan and Wu, "Seismic horizon refinement with dynamic programming," SEG International Exposition and 90th Annual Meeting, Society of Exploration Geophysicists, 2020, 5 pages.

GCC Examination Report in GCC Appln. No. GC 2020-39162, dated Jun. 10, 2021, 4 pages.

\* cited by examiner

MAP VIEW SHOWING ATTRIBUTE RESULTS
USING A CONTINUOUS COLOR BAR

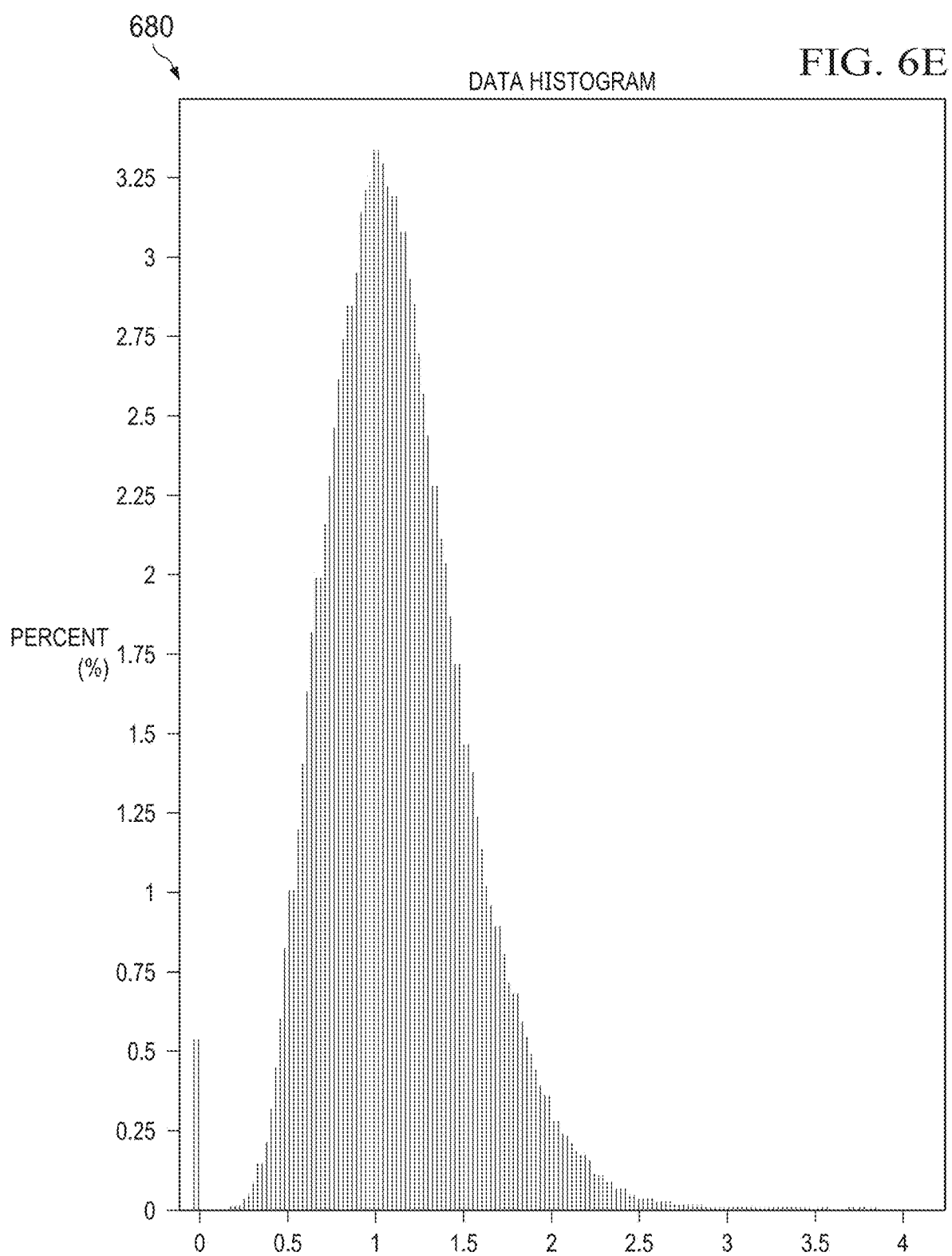

MAP VIEW SHOWING ATTRIBUTE RESULTS

GENETIC QUALITY OF PICK ATTRIBUTE FOR SEISMIC CUBES AND SURFACES

TECHNICAL FIELD

This disclosure relates to methods, systems, and apparatus for improving the exploration for hydrocarbons.

BACKGROUND

Hydrocarbons, such as oil and gas, occurs in the Earth's subsurface at a depth ranging from 1,000 meters to several kilometers and is found in microscopic cavities. As such, prospecting for hydrocarbons includes geological surveys collected through, for example, seismic prospecting. These geological surveys can be employed to construct geological maps representing the structure of areas of the outer crust of the Earth. Moreover, outcropping of rock beds, their composition, origin, age, and deposition forms may also be studied when prospecting for oil and gas. For example, the boundaries of distribution of these rocks may be plotted on topographical maps and areas of possible deposits outlined. These areas can be further prospected and explored in detail to, for example, estimate hydrocarbons deposits.

SUMMARY

Implementations of the present disclosure are generally directed to a system for detecting hydrocarbon by studying wavelets from a three-dimensional (3D) seismic data set (seismic cube) as population and determines the normality and abnormality for each individual wavelet according to population trend or according to a single reference model and therefore is global. The described system be employed to highlight locations with geological features similar to a given known location. This is useful when, for example, a well is drilled and the reservoir characteristics at the well are determined. As such, the surface attribute maps provided through the described system may be employed to assist in targeting or avoiding similar location depending on the well results.

Methods, systems, and apparatus, including computer programs encoded on a computer storage medium, to generate a custom seismic surface and volume attribute. In one aspect, a method includes receiving a seismic cube and a seismic surface, and the seismic cube includes traces recorded at receivers deployed to collect seismic data. The seismic surface is picked on the seismic cube. Seismic wavelets are extracted with a selected length from the seismic cube along an intersection with the seismic surface for each spatial coordinate associated with the seismic surface. A reference wavelet is determined. A surface attribute map is generated based on comparing each of the seismic wavelets to the reference wavelet. A productivity of the seismic surface is evaluated using the surface attribute map.

Particular implementations of the subject matter described in this disclosure can be implemented so as to realize one or more of the following advantages. The described system provides a spatially global assessment and quantification of seismic surface pick quality. The described system also provides a way to detect geological and depositional changes along seismic surface. The described system provides a global (not local) way to compare any two spatial locations on the surface for depositional environment differences and how each is compared to the average or a deliberately chosen depositional environment. The described system is useful for seismic hydrocarbons prospecting and any organization working with seismic prospecting is potentially interested.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 6A-6E depict surface picks in accordance with some implementations of the present disclosure.

DETAILED DESCRIPTION

This disclosure generally describes a system to generate a custom seismic surface and volume attribute that can be employed in seismic exploration for hydrocarbons. The disclosure is presented to enable any person skilled in the art to make and use the disclosed subject matter in the context of one or more particular implementations. Various modifications to the disclosed implementations will be readily apparent to those skilled in the art, and the general principles defined in this application may be applied to other implementations and applications without departing from scope of the disclosure. Thus, the present disclosure is not intended to be limited to the described or illustrated implementations, but is to be accorded the widest scope consistent with the principles and features disclosed in this application.

In some implementations, seismic prospecting can be employed to determine the structure of rock deposition using artificially created elastic oscillations (seismic waves) when passing though the stratum. In terms of physics, these are the same acoustic waves as on the surface, which resulted from a medium perturbance and reflected from a surface. Echoes of seismic waves are detected by seismographs. Furthermore, seismic prospecting can be employed not only for finding structures, which can contain hydrocarbons, but also for the selection of an optimal site for drilling prospecting wells. Seismic method is also often used in conjunction with drilling to enhance reliability of forecasting.

Seismic prospecting may be employed to generate two-dimensional (2D) or flat images as well as 3D or stereoscopic images of a crust section, where Hydrocarbons deposits may be found. In some implementations, four-dimensional (4D) seismic prospecting can be employed where recurrent observations of a 3D survey allow for, for example, better real-time control over field development conditions.

As used within this application, the term "real-time" refers to transmitting or processing data without intentional delay given the processing limitations of a system, the time required to accurately obtain data, and the rate of change of the data. In some examples, "real-time" is used to describe the analysis and determination of a solution by the described rock sample characterization system.

Figure 6A:
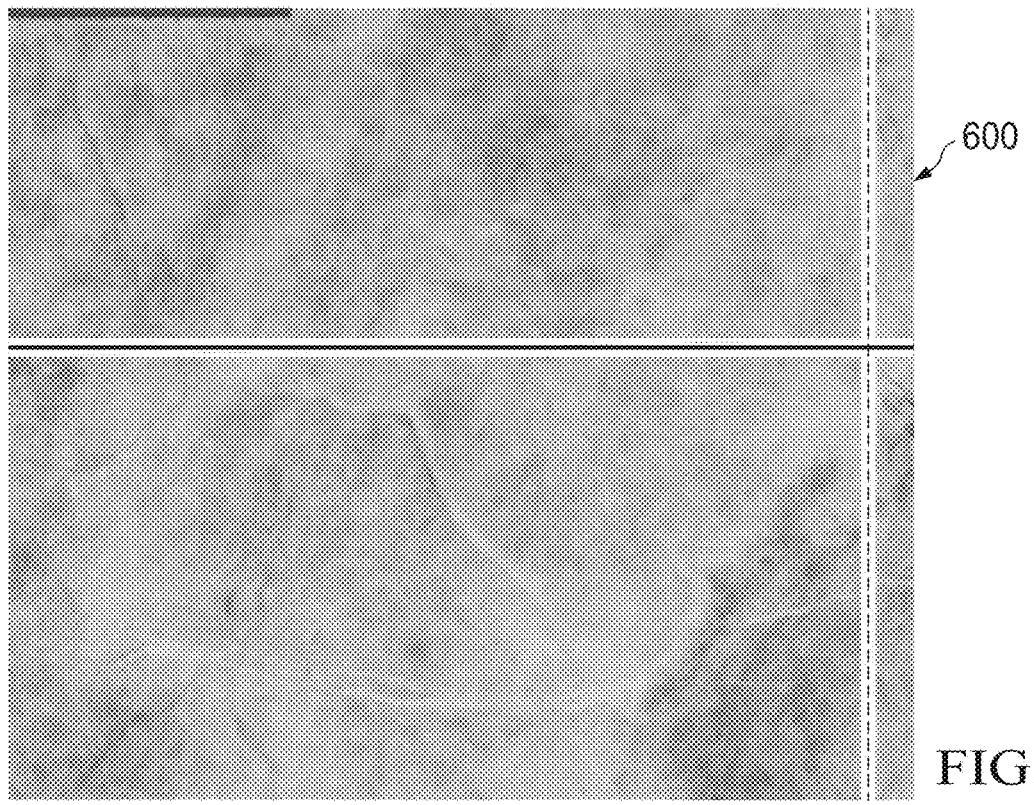
Figure 6B:
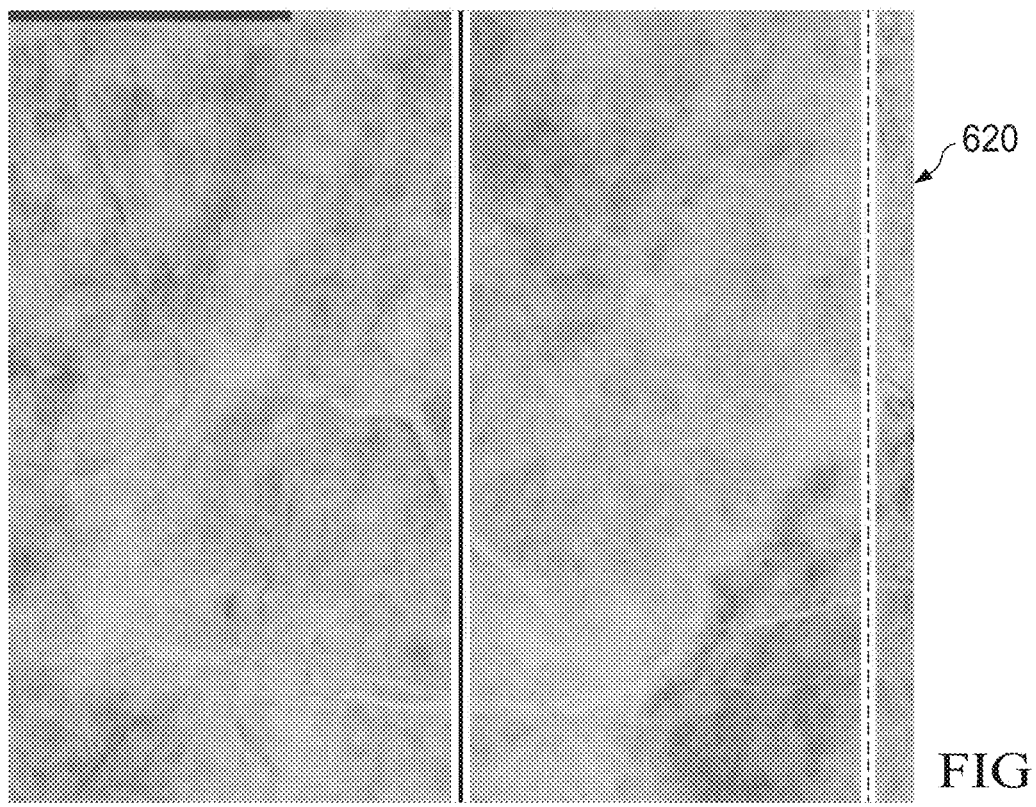
Figure 6C:
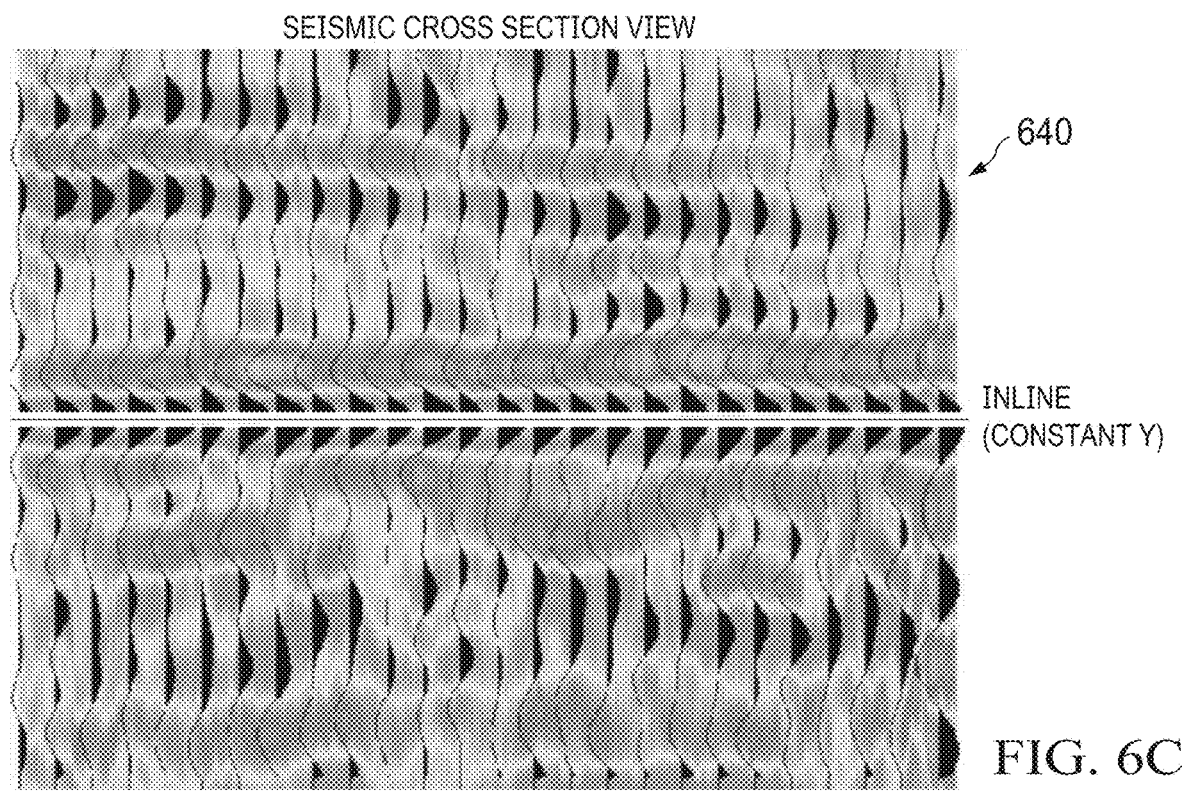
Figure 6D:
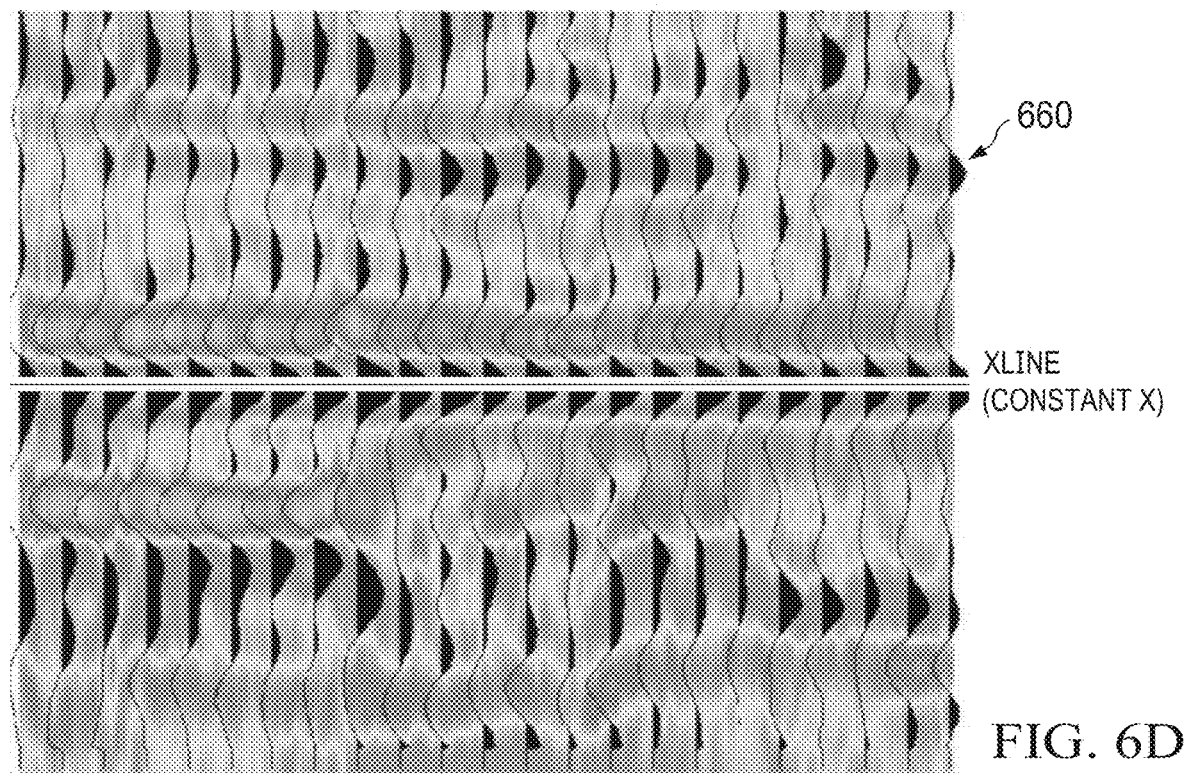
Figure 7A:
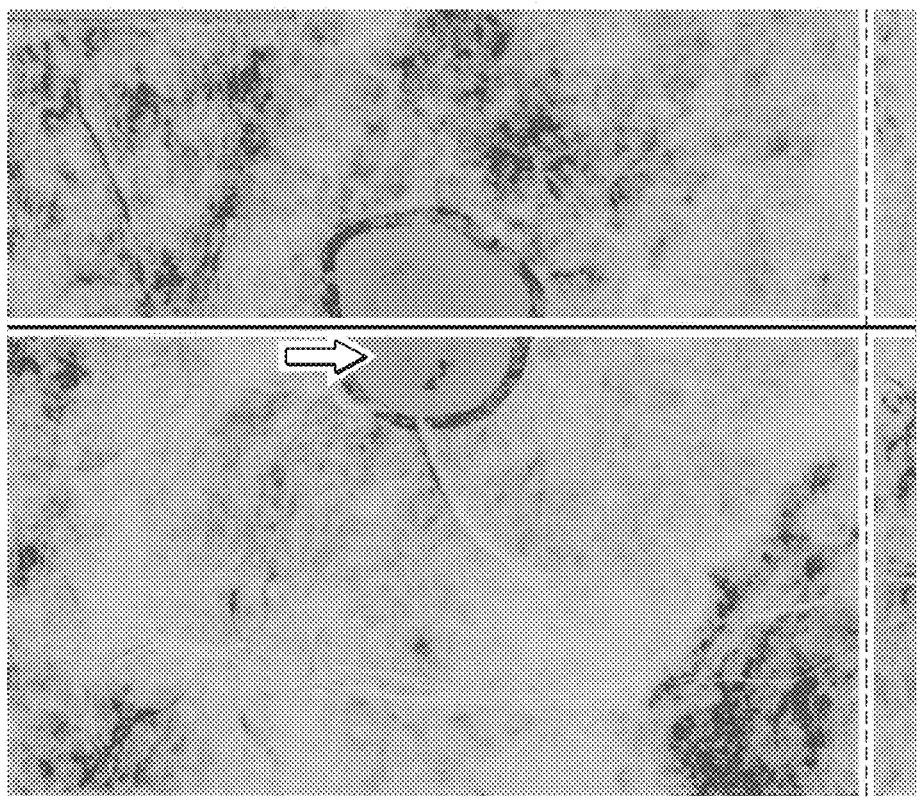
FIGS. 7A-7E depict surface picks in accordance with some implementations of the present disclosure.
Figure 7B:
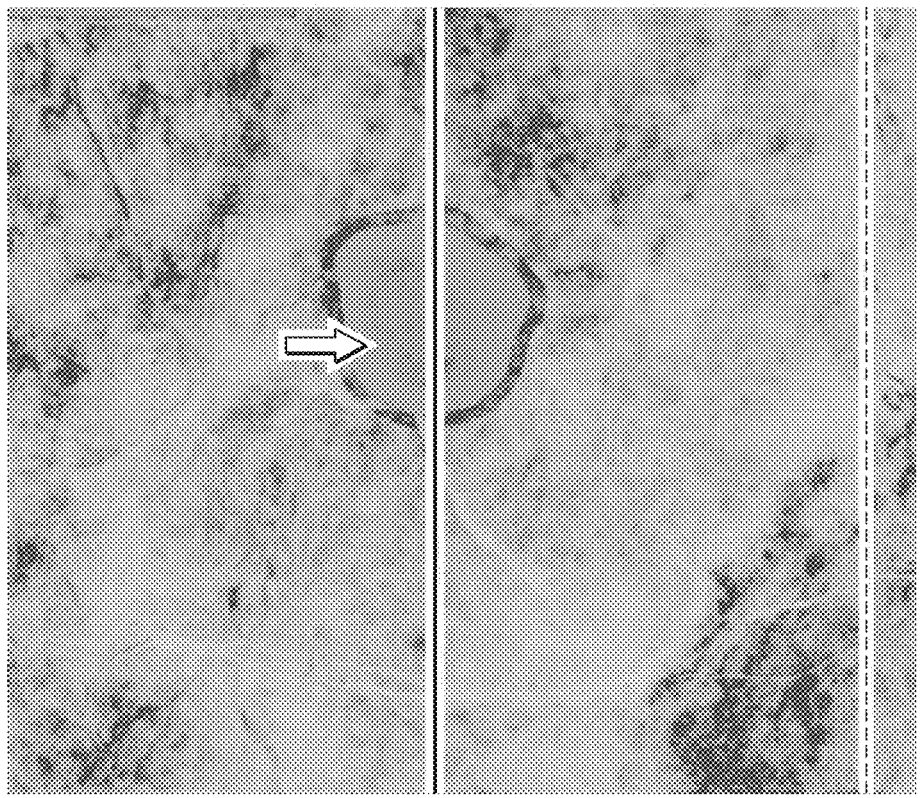
Figure 7C:
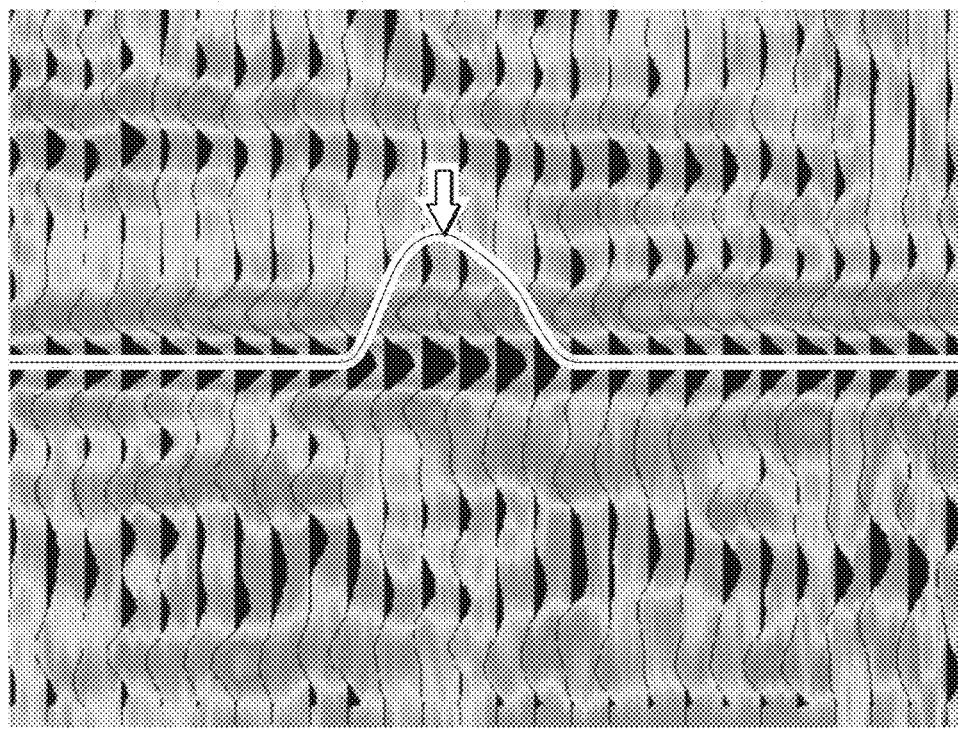
Figure 7D:
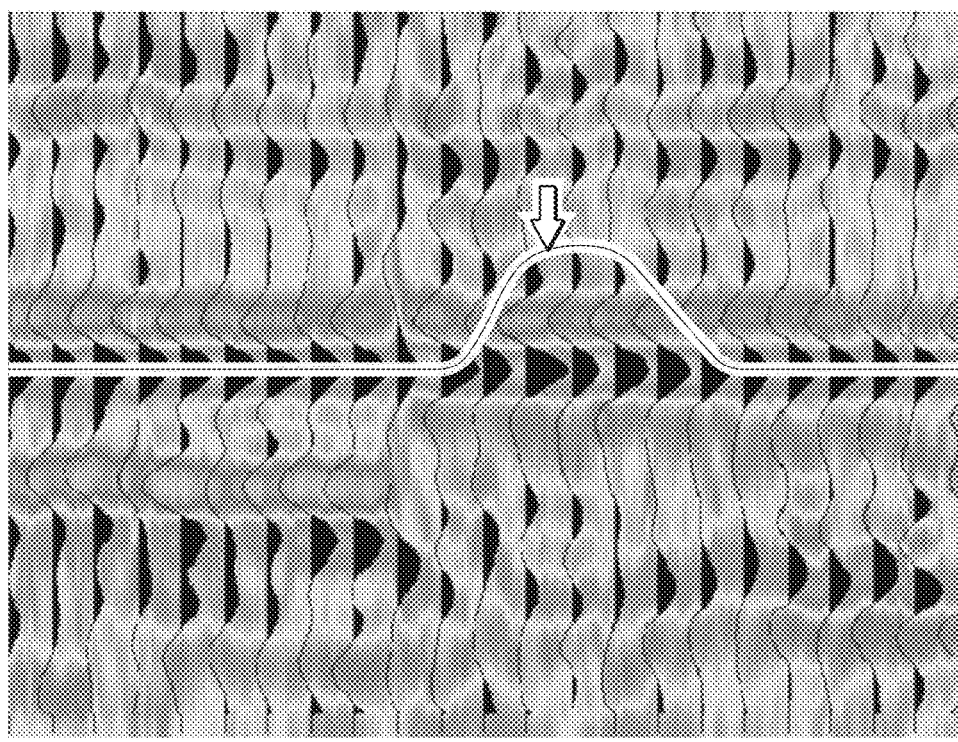

In view of the forgoing, the described system provides for a custom seismic surface and volume attribute that can be employed in seismic exploration for hydrocarbons. In some implementations, the described system, provides a measure to quantify the quality of surface pick to help an interpreter to quickly find areas of bad pick and quantify how bad the picks are. The pick is described as good or of high quality if it consistently tracks, follows and stays on the same seismic event everywhere and does not cross it to above or below events. In geological terms a high quality pick follows and tracks sediments of the same geological age and does not cross it to younger (above) or older (below) sediments. In practice a pick is never perfect everywhere and a good pick is a pick that tracks the same event almost everywhere. FIGS. 6C & 6D show example of a good pick while FIGS. 7C and 7D show example of a bad pick. A pick includes the interpretation of data, such as seismic sections, by, for example, selecting and tracking marker beds or other events. A pick may also include a feature interpreted or selected from data, such as a seismic event. Correlation of seismic picks to geologic picks, such as formation tops interpreted from well logs, can improve interpretations. In some examples, a seismic section includes a display of seismic data along a line, such a 2D seismic profile or a profile extracted from a volume of 3D seismic data. A seismic section may include numerous traces with location given along the x-axis and two-way travel time or depth along the y-axis.

In some implementations, the quantification of a surface pick is a spatially global measure and not a local measure. In some implementations, the custom volume attribute can be employed to highlights stratigraphic features. These stratigraphic features can included, for example, channels, faults, and sand bodies in the subsurface. Such features are can be valuable targets for exploration because, for example, they may harbor stratigraphically trapped hydrocarbons. The described system may also be employed to highlight and identify similar geological features to a given known location.

In some implementations and as describe in detail below with reference to FIG. 1, input seismic volume and a picked surface are selected for the generation of a surface attribute map. The value of the attribute on this map may be employed to assess the quality of the surface pick. For example, badly picked areas may appeared as low or negative values. Furthermore, after making sure the pick is of accepted quality, anomalous valued areas may highlight stratigraphic features, such as channels, faults and sand bodies.

In some implementations, the described system, may be employed to extract wavelets from a seismic cube along a picked surface. Although these wavelets tend to be coherent and produce a constructive average, each individual wavelet is different. The difference between wavelets in different locations is due to many factors, which include, for example, geological setting, lithology, thickness, processing, picking, and so forth. This difference can be used to quantify pick quality and detect stratigraphic features. For example, if two wavelets are different, then it can be assumed that either the pick is wrong on one or both of them, or that the geology is different causing the seismic response to differ.

The extracted wavelet can be studied as population to determine the normality and abnormality for each individual wavelet according to population trends or according to a single reference model. Each gene (or sample) in a given wavelet within a population can be compared to a corresponding gene in another wavelet in the same population or to a corresponding gene in a reference wavelet, which may be outside of the population. Therefore, evaluations performed by the described system are global and not local as the evaluations do not depend on the location of a current wavelet or an individual within the volume or surface. As such, the described system can be employed to, for example, (1) quantifying surface pick quality, (2) highlight and identify stratigraphic features, such as channels, faults among other depositional features, and (3) identify similar geological settings to a given known location.

It is also possible to choose a particular wavelet from the population as the reference wavelet. For example, as described later, a wavelet may be chosen because its location coincides with a well location. In such cases, the result of the described system may highlight geological features similar to the chosen location. However, any wavelet, real or synthetic, may be selected.

The described system may extract the wavelet population and condition them though a conditioning function to assess the quality of seismic surface pick globally. For example, the described system may be employed to globally assess seismic horizon and surface pick quality to help quantify the accuracy of such picks. The described system also may be employed to outline stratigraphic features of interest, such as channels, faults and sand bodies, which solves and improve the detectability of these features as it is often the case that these features are hard to detect and delineate from original seismic data. As such, any attribute that can better detect and define them is of value to seismic hydrocarbon prospecting.

Moreover, the described system may be employed to highlight locations with geological features similar to a given known location. For example, the generated surface attribute maps provided through the described system may be employed to assist in targeting or avoiding similar location depending on the well results. This can be useful when, for example, a well is drilled and the reservoir characteristics at the well are determined. Additionally, because seismic response on a given formation surface (top) should display a clear average response (e.g., constructive, not random), these wavelets can be averaged meaningfully such that a global trend exist.

Figure 1:
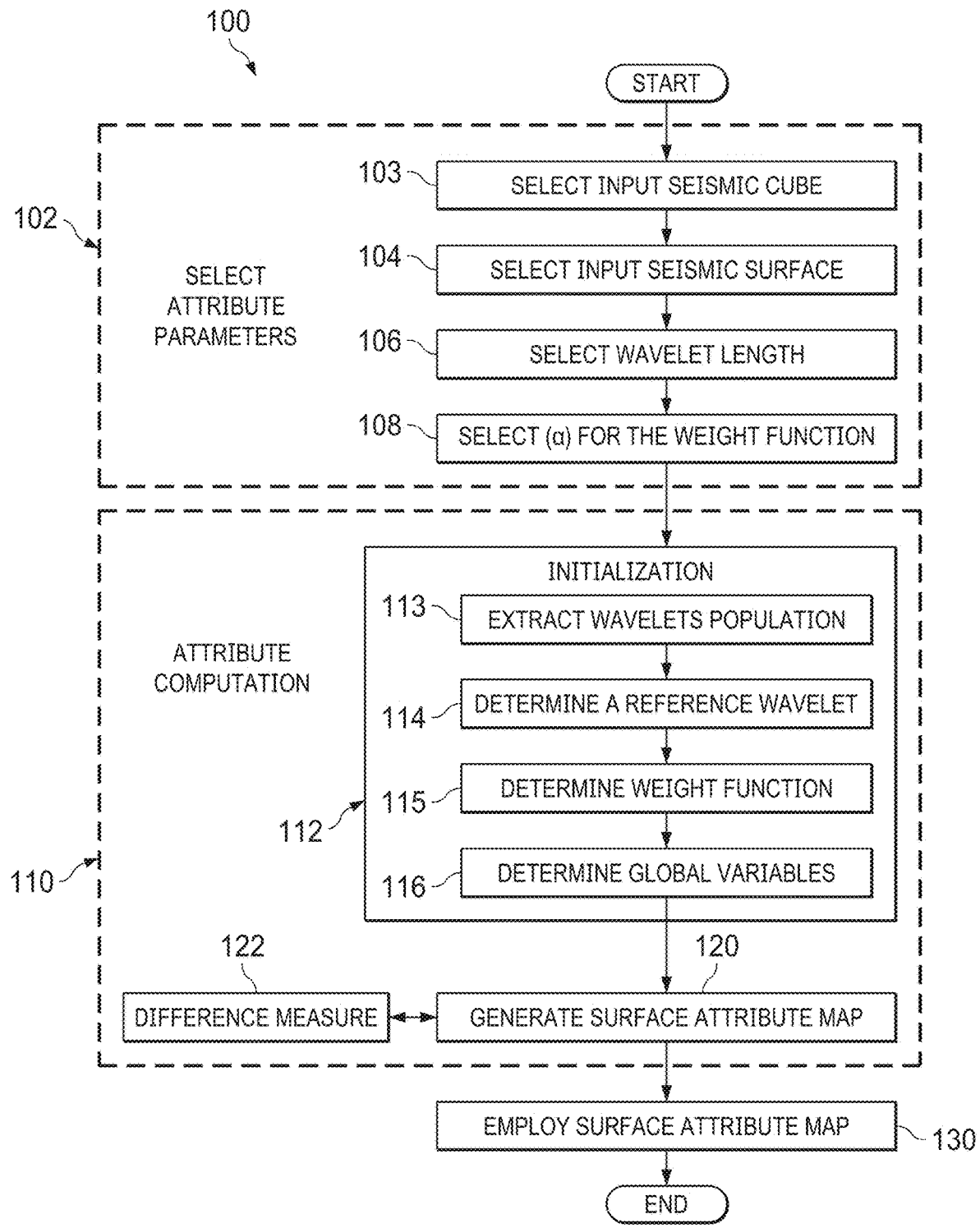
FIG. 1 depicts a flow diagram of an example process employed to calculate a surface attribute map according implementations of the present disclosure.
Figure 5:
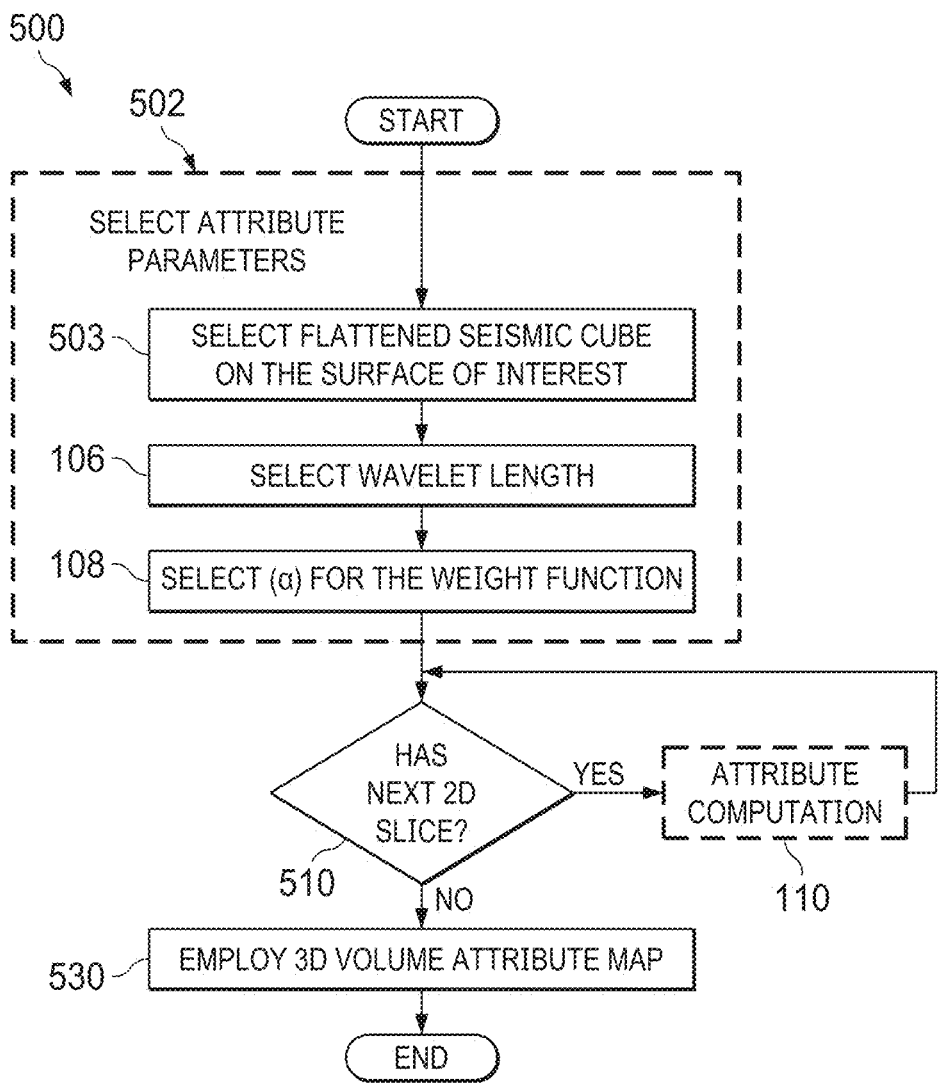
FIG. 5 depicts a flow diagram of an example process employed to generate a 3D volume attribute according implementations of the present disclosure.
Figure 11:
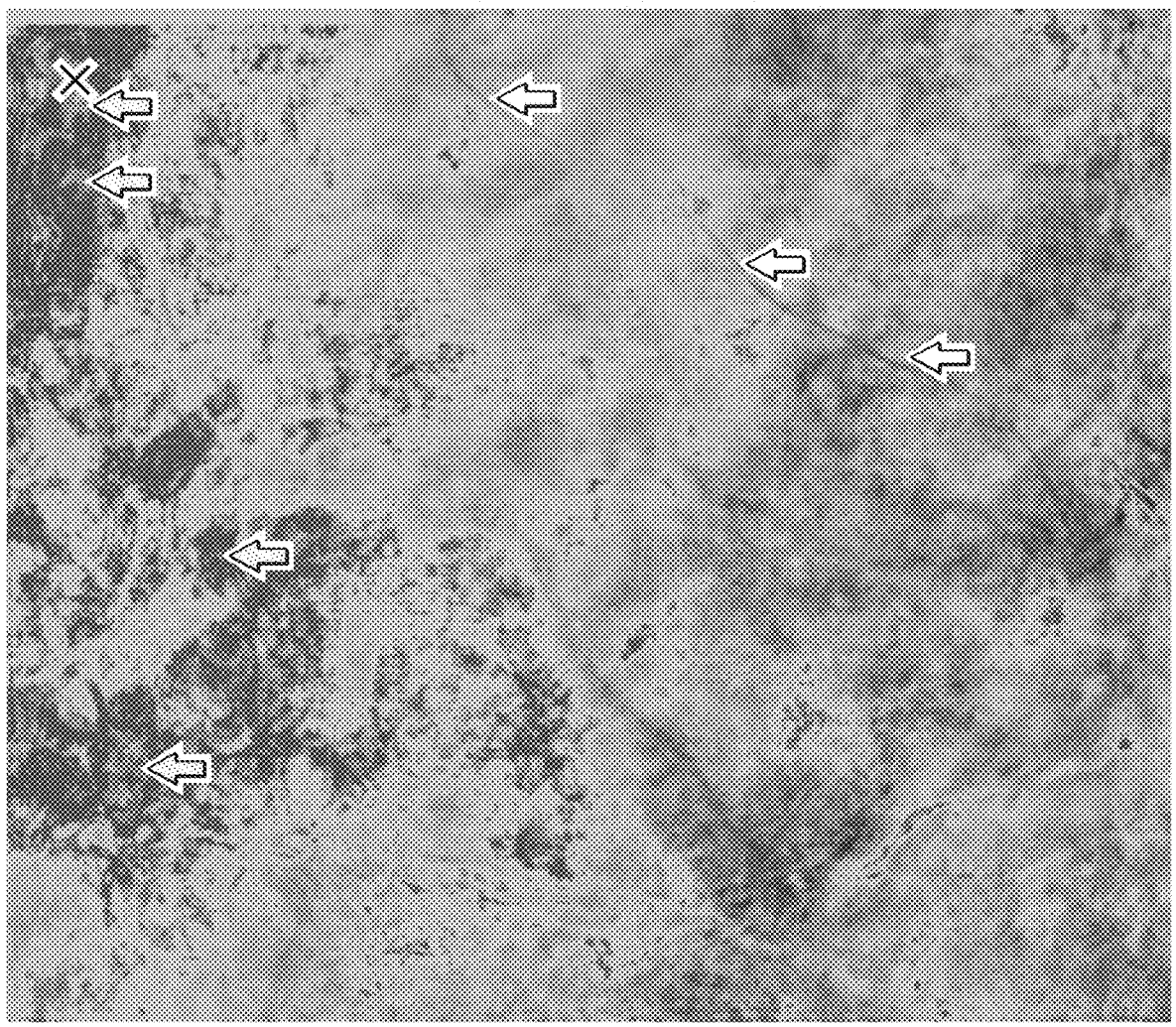
Figure 12:
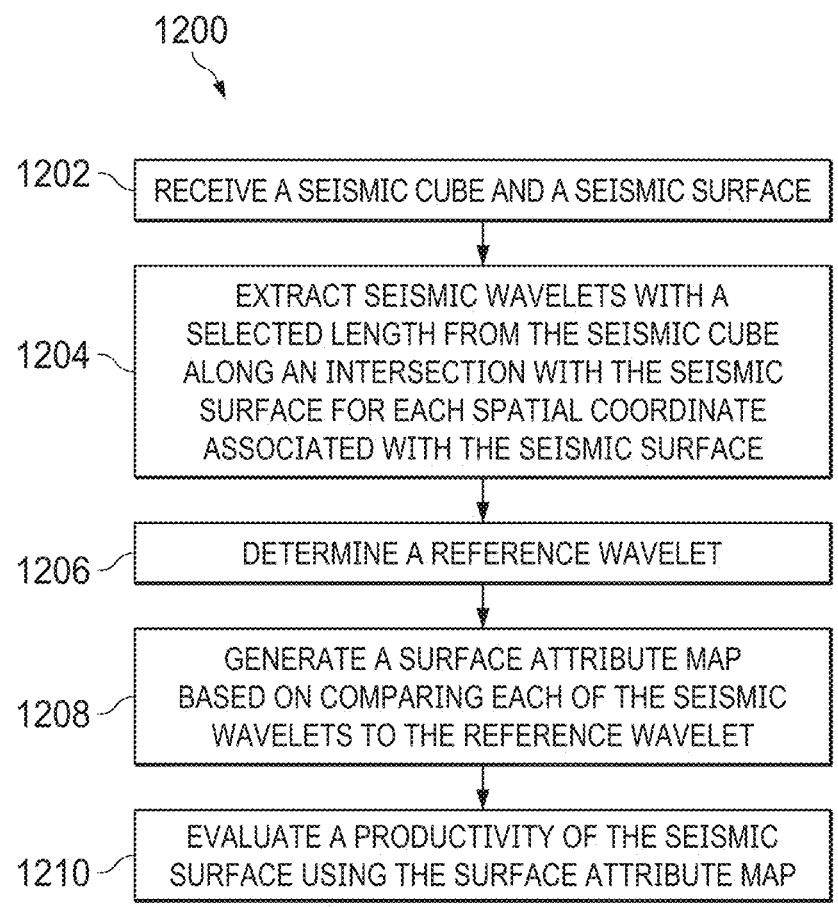
FIG. 12 depicts a flow diagram of an example process to generate a custom seismic surface and volume attribute that can be employed in seismic exploration for hydrocarbons

FIGS. 1, 5, and 12 depict a flow diagrams example processes that can be employed by the described system and according implementations of the present disclosure. For clarity of presentation, the description that follows generally describes the respective processes in the context of FIGS. 1-13. However, it will be understood that processes may be performed, for example, by any other suitable system, environment, software, and hardware, or a combination of systems, environments, software, and hardware. In some implementations, various steps of depicted processes can be run in parallel, in combination, in loops, or in any order.

FIG. 1 depicts a flow diagram of an example process 100 employed to calculate a surface attribute map according implementations of the present disclosure. In general, a surface attribute is a number calculated for each X and Y location. Since each X and Y location has a single number, a 2D array of numbers or a 2D map is produced. This 2D map can be viewed similar to a satellite, elevation or heat map. In this case, the map can give information about the pick quality in every X,Y location. Generally, at 102 the attribute parameters are obtained/generated. These parameters are provided for attribute computation 110 to generate the surface attribute map, which can then be employed at 138 as described later. The selection steps 103-108 are included in the generation of attribute parameters step 102, while the initialization step 112 as well as steps 120 and 122 are included in the attribute computation step 110.

At 103 a 3D seismic data set (seismic cube) is selected as input for the attribute contribution step 110. In some implementations, a seismic cube includes various traces recorded at receivers deployed to collect seismic data. A seismic trace is the sound recorded by a given receiver as 1D samples of amplitude versus time during seismic surveying. Seismic cube consists of many traces usually collected in a regular gridded interval spatially in X and Y making the seismic cube a 3D array of numbers.

At 104, the surface pick (seismic surface) is selected as input for the attribute contribution step 110. In some implementations, a seismic surface is a 2D surface in a 3D space. This means every X and Y location has a single Z value but this Z value does not need to be constant for every X and Y. So a surface can go up and down. Seismic surface is picked on a seismic cube to track a layer of a give single geological age everywhere.

At 106, wavelet length (e.g., the number of samples or genes) is determined for the selected seismic cube and provided as input to the contribution step 110. The wavelet length is the number of samples above+number of samples below +1. The wavelet length is the same of all wavelets and is selected at the beginning by the user (or a default value) but once it is selected it does not change subsequently during the running of the algorithm. In some implementations, the wavelet length is the same for all extracted wavelets and is determined automatically. The wavelet length may also be overridden by an interpreter if needed. As an example, the automatic determination of wavelet length may assume a 40 microsecond (ms) long wavelet centered on a surface. For example, for seismic data with a 4 ms sampling interval, the wavelet may be 11 samples (or genes) long with 5 samples above the surface, 5 samples below the surface and 1 sample on the surface. This can be overridden by an interpreter to change the length or the start and end of the wavelet depending on the purpose or other available information. For example, the interpreter can make the wavelet 11 samples below the surface with no samples above if the phase of the source wavelet is known. The interpreter may also elect to make the wavelet shorter to, for example, produce high vertical resolution or longer to produce, for example, low vertical resolution result.

At 108, a parameter reference is selected as (a) for a weight function and can be employed to give weight to each of the genes. In some implementations, the single parameter (a) weight function has a single parameter reference as (a) that ranges from 0.1 to 0.99 with a recommended default settings of $\alpha=0.2$.

At 110, computation is performed on the selected attributes (inputs) to generate a surface attribute map. As described previously, the attribute computation step 110 includes steps 112, 120, and 122.

At 112, because these variables do not change from one wavelet to another, but rather depend on the initialization parameters and a reference wavelet, they may be pre-computed in initialization step 112. As depicted, the initialization step 112 includes steps p113-116.

At 113, the wavelets are extracted from the seismic cube along the picked surface (plane) for each spatial coordinate within the plane. In some implementations, the plane may be defined according to a coordinate system in which the special coordinates of a point are defined according its distances from a set of perpendicular lines (e.g., defined as x and y) that intersect at an origin. For example, the spatial coordinates may be defined according to the perpendicular lines, inline and crossline, where inline refers to the direction in which receiver cables used to collected seismic data (e.g., through a series of attached receivers) are deployed and crossline refers to the direction that is perpendicular to the orientation of the receiver cables. In some examples, a wavelet is a one-dimensional pulse that is typically the basic response from a single reflector. Each wavelet includes a number of attributes, which may include the wavelet's amplitude, frequency and phase. In some examples, a wavelet originates as a packet of energy from a source point and has a specific origin in time. A wavelet can be returned to the receivers as a series of events distributed in time and energy. This distribution is a function of velocity and density changes in the subsurface and the relative position of the source and receiver. The energy that returns cannot exceed the energy that was input, thus the energy in any received wavelet decays with time as more partitioning takes place at interfaces. Wavelets also decay due to the loss of energy as heat during propagation. This is more extensive at high frequency, so wavelets tend to contain less high-frequency energy relative to low frequencies at longer traveltimes. Some wavelets are known by their shape and spectral content, such as the Ricker wavelet.

Figure 2A:
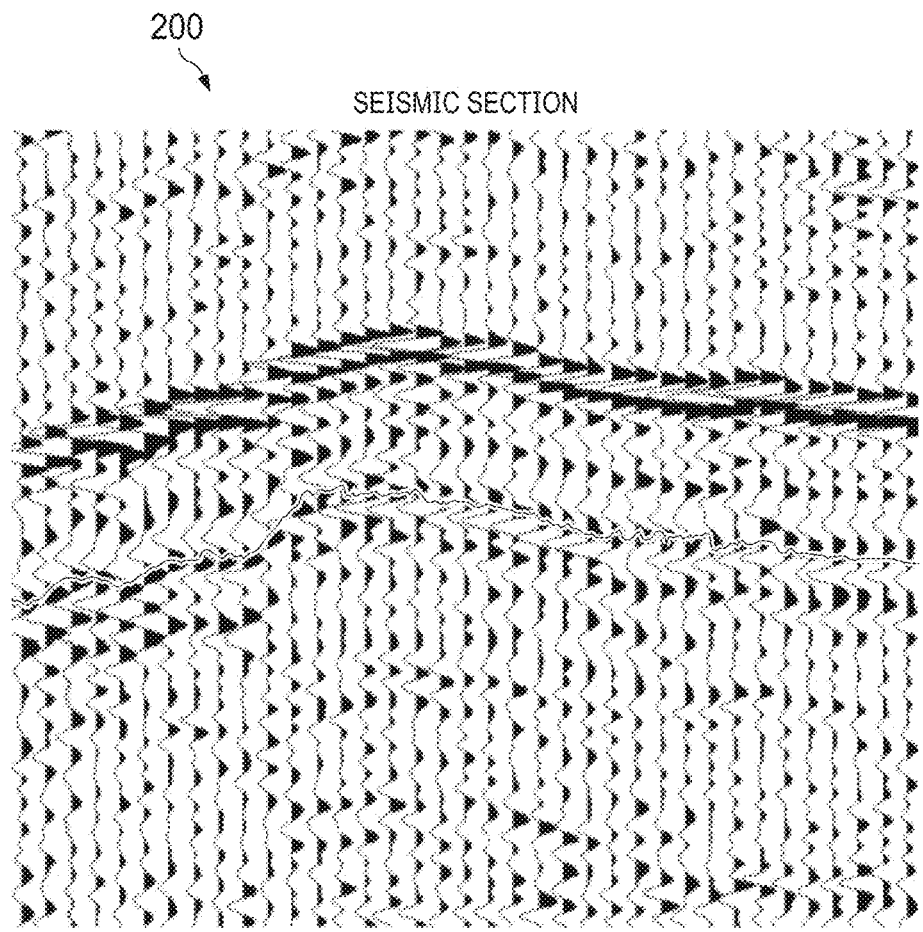
FIG. 2A depicts an example seismic section.
Figure 2B:
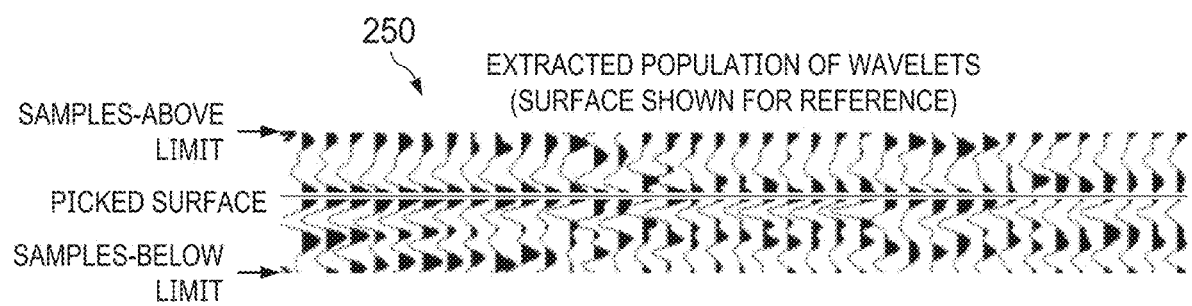
FIG. 2B depicts an extracted population of wavelets.
Figure 3:
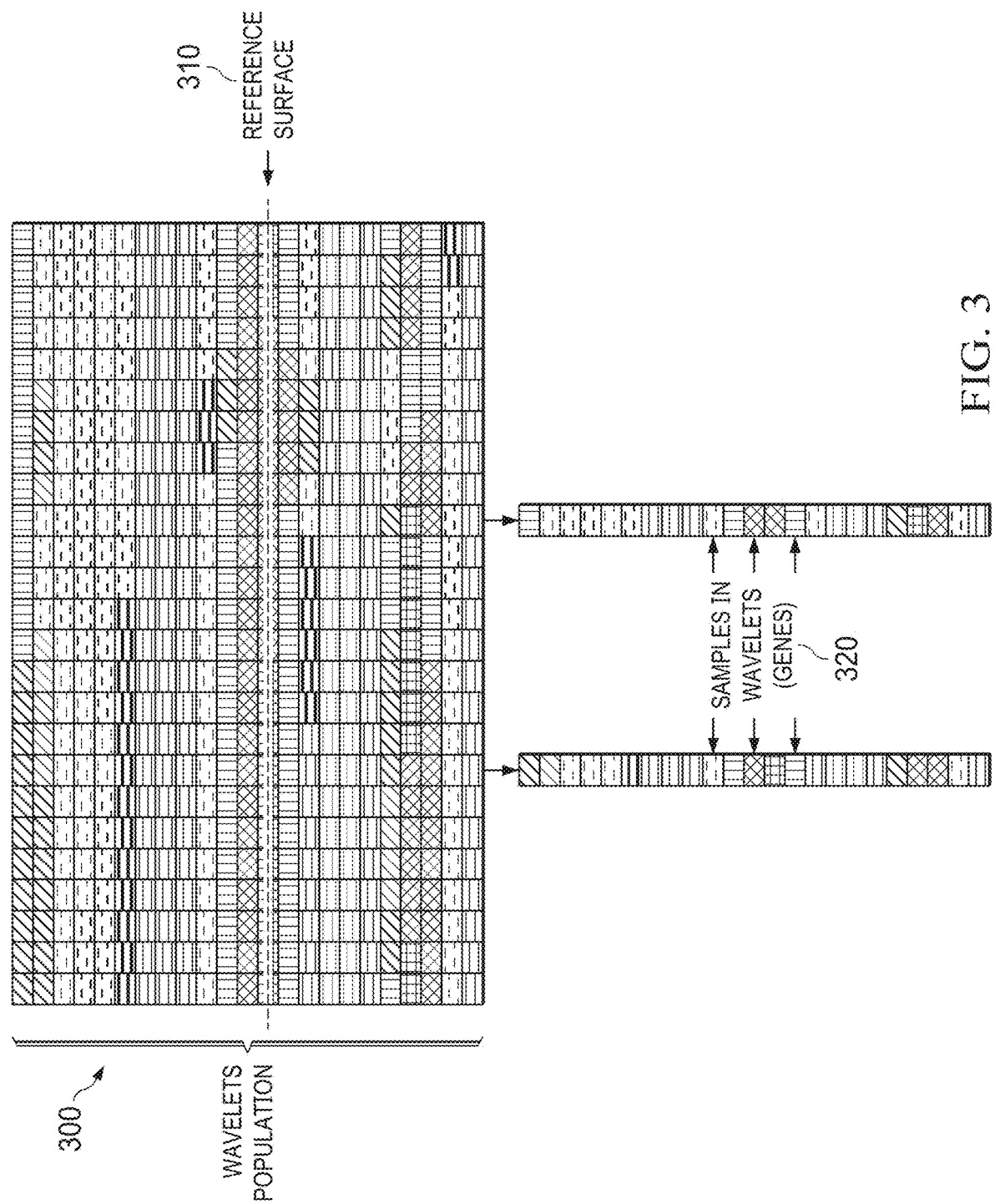
FIG. 3 depicts a wavelet population with a reference surface and genes (samples) in the wavelets.
Figure 4A:
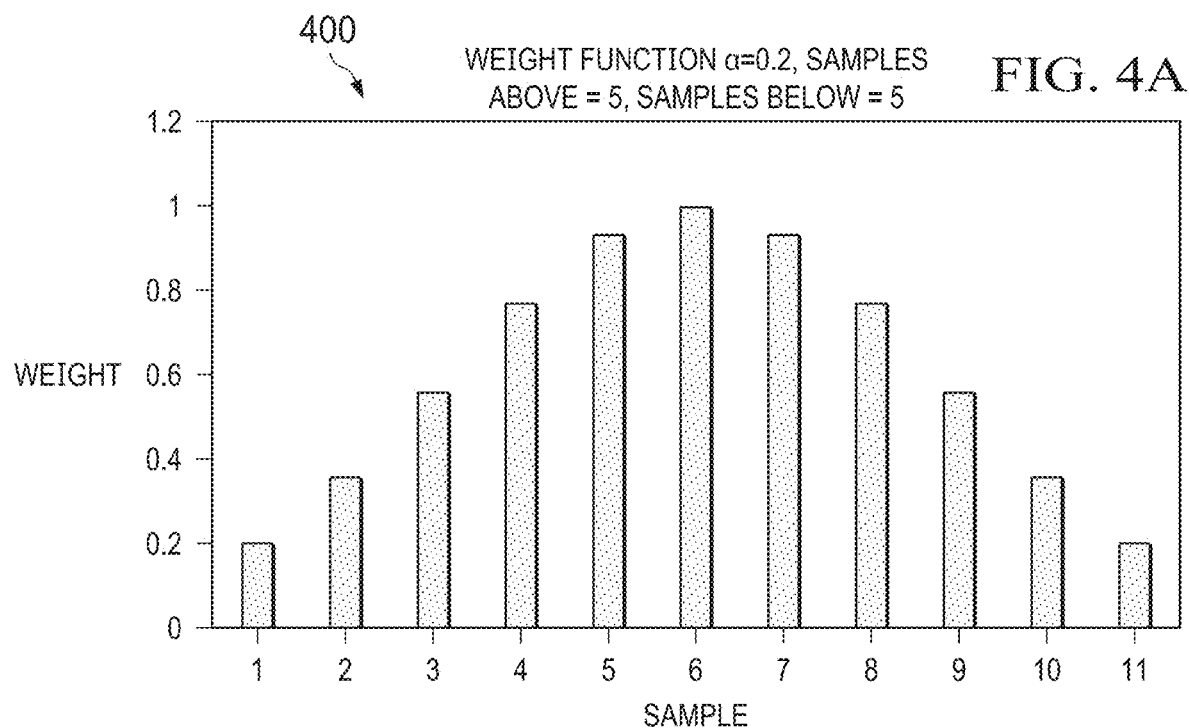
FIGS. 4A-4D depict example outcomes that show different choices of weight function.
Figure 4B:
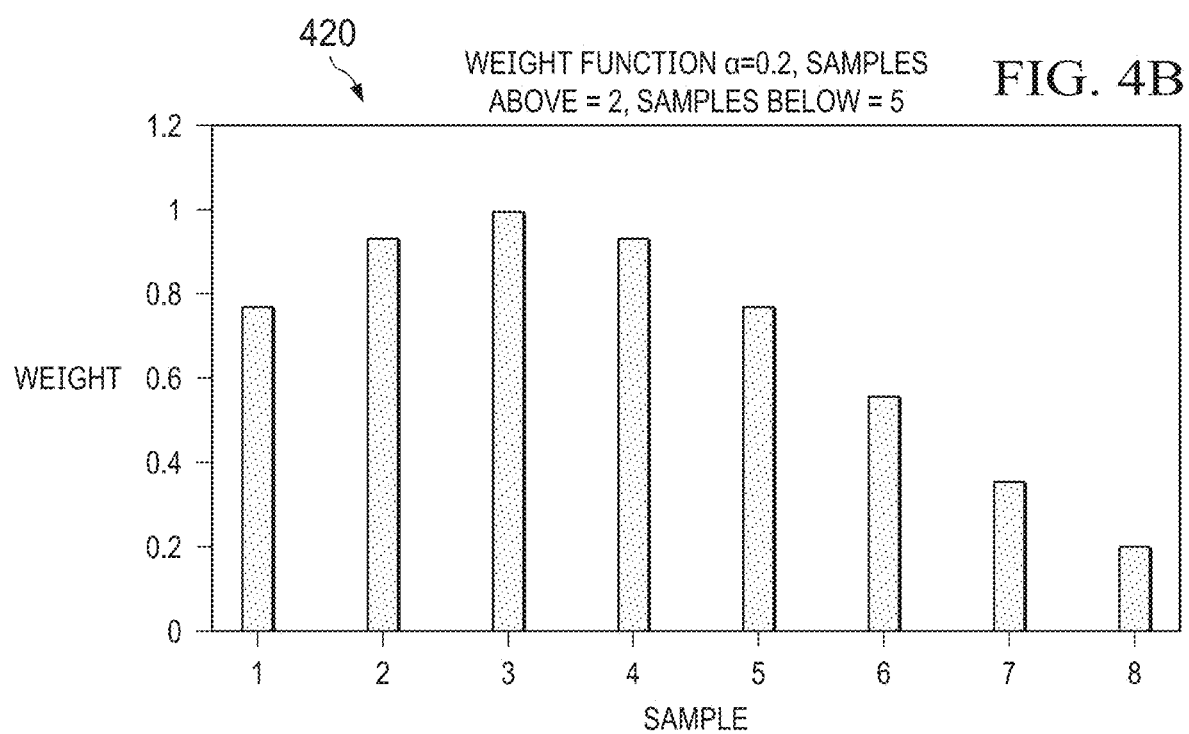
Figure 4C:
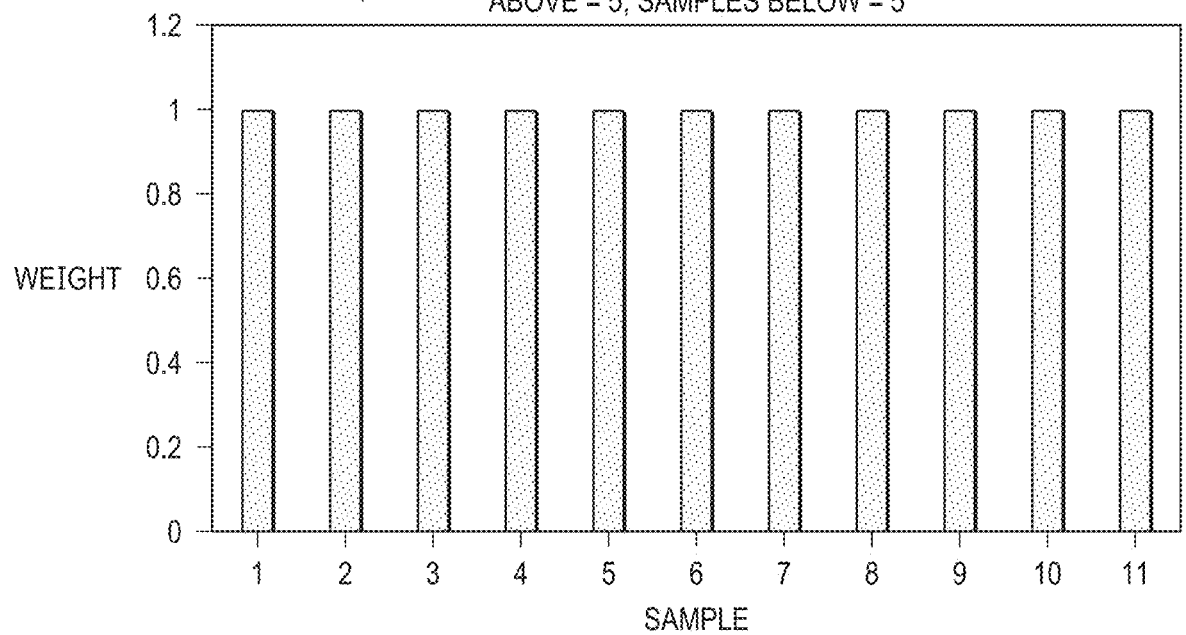
Figure 4D:
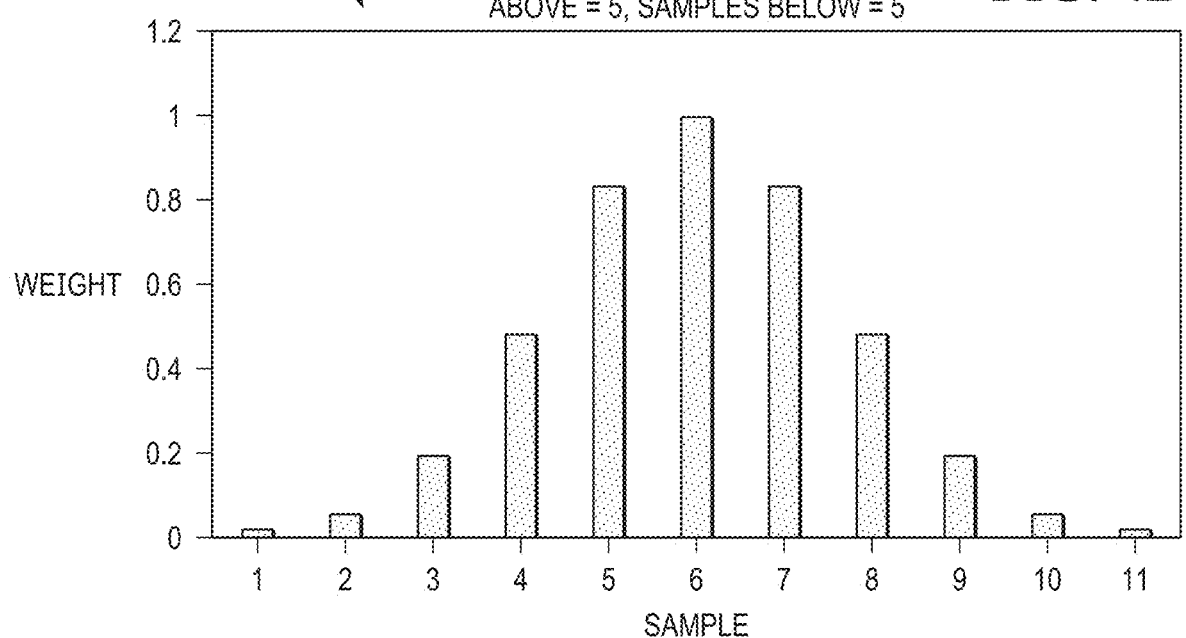

FIGS. 2A, 2B, and 3 depicts how the wavelets may be extracted along the picked surface). FIG. 2A depicts an example seismic section 200. FIG. 2B depicts an extracted population of wavelets 250. FIGS. 2A and 2B depicts how wavelets are extracted around a picked surface according to the number of samples both above and below the surface. Once these wavelets are extracted, they can be studied as a population of individuals with a global trend and individual differences. FIG. 3 depicts a wavelet population 300 with a reference surface 310 and genes (samples) in the wavelets 320. FIG. 3 shows how wavelets can be considered as individuals in a population each with multiple genes. The described system may compare these genes to corresponding genes in other wavelets and to the population trend.

Once the wavelets are extracted, a reference wavelet is determined at 114. In some implementations, the reference wavelet is computed as the mean of all wavelets, where every gene (or sample) in the reference wavelet is the average of all corresponding samples (or genes) in the population of wavelets. In such implementations, the reference wavelet is therefore the same length as any other wavelet. This way the wavelets are then compared to the trend of the population. In some implementations, the reference wavelet is calculated as the median of the population of wavelets instead of the mean. If the median is chosen, then the result may be similar to what is descripted here and will be interpreted similarly (to provide quality of pick and highlight stratigraphic features). In some examples, the median and mean are identical or very close when the distribution of wavelets is normal or close to normal. However, the median may have advantage over the mean in some cases where there are anomalies (outliers) in the data especially if these anomalies are artifacts of data acquisition or processing and thus not wanted because they do not represent true earth. In these cases, the median will be better because it is not sensitive to anomalies. Computing the median however may be more time consuming than computing the mean especially for large datasets.

During the initialization step 112, global variables (at 116) and functions (at 115), such as the weight function, are determined to be employed in the output attribute map calculation. Such an initialization function be defined according to:

samples above, number of samples below and alpha which is just a number between 0.1 to 0.99. The wavelets as depicted in FIGS. 2A and 2B are extracted from the seismic cube, seismic surface and the samples above, samples below and extracts. The initialization function can also compute the set of weights according to the number of samples above, below and the parameter alpha which are user input. Once the weights are computed and the wavelets are extracted, the initialization function computes a single special wavelet which is called the reference wavelet. The reference wavelet can be the mean of the population of wavelets although other ways of defining the reference wavelet is possible and some are described in this disclosure. Once the reference wavelet is computed a special number (akin to wavelet energy) is computed from the reference wavelet. This number is similar to energy but is not exactly the energy of the reference wavelet since it is modulated by the weights. The weight modulation is useful part of the invention to give the user the ability to assign different weights (or importance) to different samples (or genes) in the wavelets. By the end of the execution of the initialization function the following inter-

```
Function initialize
    wL = samples above + samples below + 1
    wavelets←extract all wavlets as descriped in figure
    weights[wL]←compute weights as descriped in table
    Wsum2←0
    Wsum←0
    for sample 1 to wL
        Wsum2←Wsum2 + (weights[sample])²
        Wsum←Wsum + weights[sample]
    end for
    referenceWavelet[all]←0 initialize all samples in reference wavelet to zero
    for each Y location
        for each X location
            for sample 1 to wL
                referenceWavelet[sample]←referenceWavelet[sample] + wavelets[x,y,sample]
            end for
        end for
    end for
    waveletsCount = XY wavelets count is total Y locations times total X locations
    for sample 1 to wL
        referenceWavelet[sample]←referenceWavelet[sample]/waveletsCount
    end for
    Rs←0
    for sample 1 to wL
        Rs←Rs + (weights[sample])(referenceWavelet[sample])²
    end for
```

$$Rs \leftarrow \frac{Rs}{W\text{sum}}$$

function end

In the initialization function, the following are the inputs and outputs with their definition:

Input: seismic cube which is a 3D seismic data
Input: seismic surface which is a surface picked on the 3D seismic cube
Output: a set of weights. The number of weights are equal to the length as any of the wavelets.
Output: a set of wavelets which are extracted based on the seismic cube, seismic surface, samples above and samples below.
Output: a reference wavelet which is a single wavelet having the same length as the other wavelets.
Output: reference wavelet energy which is a single number.

The initialization function works as follows. A user gives a seismic cube, a seismic surface and selects number of mediate outputs are ready: wavelets population, reference wavelet, energy of the reference wavelet and the set of weights.

In some implementations, the weight function is calculated given the parameter a and number of samples above and below the surface. Such a weight function may be defined according to:

```
Function compute_weights; inputs: samples above, samples below,
α; outputs weights[wL]
    wL = samples above + samples below + 1
    N = max(samples above, samples below)
```

$$v = -\frac{N^2}{2\ln(\alpha)}$$

```
for index = 1 → wavelet length
    d = |index − 1 − samples above| weights[index] = e^(−d²/2v)

end for
return weights array
Function end
```

In the weight function the following are the inputs and outputs:
Input: samples above
Input: samples below
Input: alpha
Output: array of weights. The number of weights is equal to the number of samples (genes) or the length of any wavelet.

The weights control how important each gene (or sample) in a given wavelet is compared to other genes in the same wavelet. A given weight is assigned to each gene and the same weight will be used on the same gene across all wavelets. The weight might not be the same for different genes in the same wavelet.

The weights are calculated one time at the beginning depending on alpha. The weights are independent of the actual data and are selected complete freely by the user. They are computed one time and then the same weights are applied on all wavelets. The purpose of the weights is to modulate the importance of each gene. The weights treat all wavelets the same way but do distinguish between different gene within a wavelet.

The weights are used to modulate the importance of each sample (gene). This is to give the user a way of specifying how important each gene is. The gene (or sample) at the surface intersection is always given a weight of 1 and this is the maximum weight possible. Depending on the selection of the alpha parameters, other genes could have any weight between almost 0 (not important) to almost 1 (equally important to the gene at the surface intersection). The weight of a given gene decrease the further away the given gene from the gene at the surface intersection. Each gene (or sample) is then multiplied by its weight during output creation to reflect its important or contribution to the final map. The weights are freely chosen by the user through the alpha parameter. FIGS. 4A, 4B, 4C and 4D show the resulting weights for various selection of alpha. They also show that the gene at the surface intersection is always given the maximum weight of 1 then the weight decrease in a rate that depends of alpha and the distance from the gene at the surface intersection.

There are geological and geophysical reasons for why the weights are needed or why different samples might have different weights or importance in the final output. The user might choose the weights depending on his/her understanding of the seismic cube, the seismic source and processing parameters, or the desired resolution of the final output.

Although the weighs are useful and are a unique part of the invention, if the weights are not included at all the invention will still work. Not including any weights is equivalent to assigning the same weights to all genes (or samples). Thus not including any weights is equivalent to alpha being 0.99. Providing the weight function, however, gives the user more options and control over the output depending on his/her understanding of the original seismic cube.

FIGS. 4A-4D depict example outcomes 400, 420, 440, and 460 respectively that show different choices of weight function. In some implementations, the sample at the surface intersection has a weight of one, which is the maximum weight but it might not be in the center. Also, when a decreases more relative, weight is given to the sample at a surface intersection and when a approaches one, weights become equal for the samples, which is equivalent to not using the weight function At 120, a surface attribute map is generated by generating a value for each spatial location. Each spatial location (e.g., coordinates defined in terms of x,y or inline,crossline) may have a real number as the value of the attribute. In some implementations, the real number can be calculated as a 2D array of real numbers as follows:

```
Function compute_output_map
    for each Y location
        for each X location
            OutputMap[x,y] ← differenceMeasureOf
                (wavelet[x,y],referenceWavelet)
        end for
    end for
    return outputMap
function end
```

This function computes the output. Here are the inputs and outputs:
Input: population of wavelets
Input: the reference wavelet
Output: 2D array of numbers each number at a given x,y is generated by the difference measure between the wavelet at that location and the reference wavelet.

The compute output function loops over all the wavelets and compares each wavelet at a given x,y to the reference wavelet to get a number and assigns that number to the x,y location of the wavelet. The actual difference measure is described in the next function which is the difference measure function. Once this loop finishes the output will be 2D array of numbers which can then be viewed as a map. Once the map is generated a geophysicist or geologist will interpret it easily because geological features will be highlighted in it (see FIGS. 9C, 10 and 11 for examples).

At 116, the difference measure is calculated. In some implementations, the difference measure is a custom function to quantify the difference between the current wavelet under investigation. This custom difference measure can be calculated given two wavelets. For example, the custom difference measure can be calculated at 122 as follows:

```
Function differenceMeasureOf(wavelet,referenceWavelet)
    nR ← 0
    Ws ← 0
    for sample 1 to wavelet length
        nR ← nR + (weights[sample])²(wavelet [sample])
            (referenceWavelet [sample])
        Ws ← Ws + (weights[sample])(wavelet[sample])²
    end for
```

$$Ws \leftarrow \frac{Ws}{Wsum}$$

$$nR \leftarrow \frac{nR}{Wsum2}$$

$$nR \leftarrow \frac{nR}{\sqrt{(Ws)(Rs)}}$$

$$differenceMeasure \leftarrow (nR)\left(\frac{Ws}{Rs}\right)$$

return differenceMeasure
function end

This function measured the difference between a given wavelet and the reference wavelet. Input and output are as follows:
Input: a wavelet
Input: reference wavelet
Output: a single number representing the difference measure This function takes one wavelet and the reference wavelet and produces a number that is a custom measure of the difference/similarity between them. The exact calculation is given in the function table above. But qualitatively speaking, each gene (sample) in the given wavelet is compared to the corresponding gene in the reference wavelet and multiplied but its weight squared. The weight controls how important the gene is in the final difference score. There are also other considerations apart from the genes and the weights. For example, two measures of a custom quantity akin to wavelet energy are used here to amplify or reduce the difference output according to its significance. Ws is a custom measure of wavelet energy (it is not exactly wavelet energy because it is modulated by the weights) and Rs is a custom measure of reference wavelet energy. The role of these two quantities is to decrease the difference measure if the current wavelet energy is much less than the reference wavelet energy because it is deemed insignificant. The difference measure will be increased if the current wavelet energy is more than the reference wavelet energy because it is deemed significant. All these factors together produce a custom measure of similarity/difference of the current wavelet compared to the reference wavelet as a single number. This single number is returned as the output of this function.

At 130, the surface attribute map along the input surface may be employed to provide, for example, a spatially global assessment and quantification of the seismic surface pick quality. The value of the surface attribute on this map may provide a way to assess the quality of surface pick. For example, badly picked areas may appear on the map as low or negative valued. The interpreter can then check and if necessary re-pick these areas. After making sure the pick is of acceptable quality, anomalous valued areas may highlight stratigraphic features, such as channels, faults and sand bodies. The described process 100 provides a global measure of quality and feature as opposed to, for example, texture attributes that work within a window and are therefore are local.

This disclosure discusses three different uses of the output map. Below is an elaboration of these three uses. Once the algorithm/program finishes, a 2D map will be generated. This map contains wealth of information that is a) useful to the interpreter and b) not usually apparent from original data or other methods in the prior art. The first use is to use the output map as a measure of surface pick quality. In this use, an interpreter can use this map to quickly check the quality of the pick, identify areas of bad quality and re-pick them if necessary. There is no measure of pick quality in prior art that we can find. But even if there is one the map produced in this invention provide a global measure of pick quality that assesses each wavelet to a global measure of the population. This process does not operate within a radius of influence but is rather global. Most of the texture attributes in the prior art operate within a radius of influence and thus are local. Using this map, areas of good pick quality will show as positive numbers. The higher the number, the better the quality. Whereas areas of low quality pick will show as low (close to zero) or negative numbers on the map. FIGS. 6A and 6B show example of high quality pick whereas FIGS. 7A and 7B show example of low quality pick.

Figure 9A:
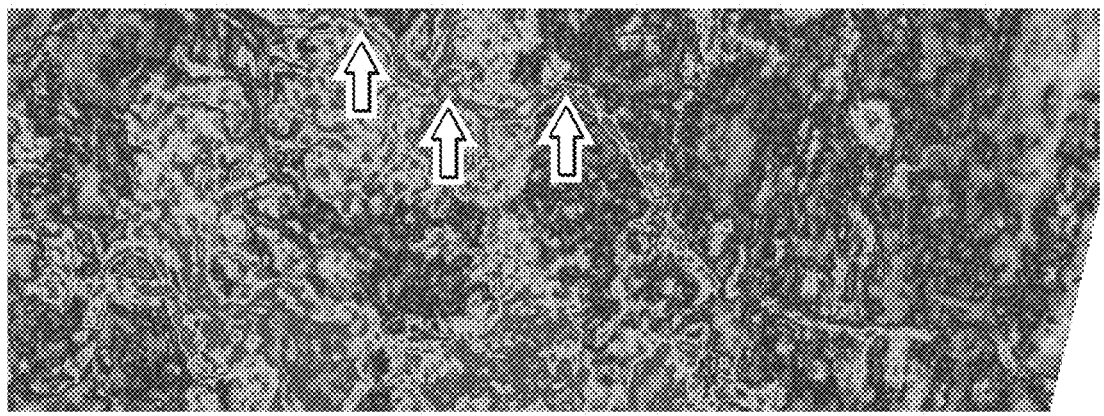
FIGS. 9A-9C depicts example slice data.
Figure 9B:
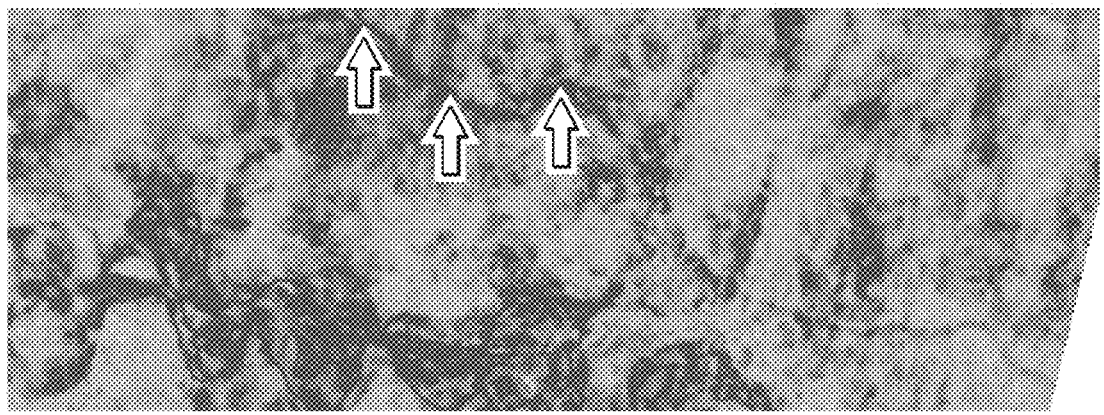
Figure 9C:
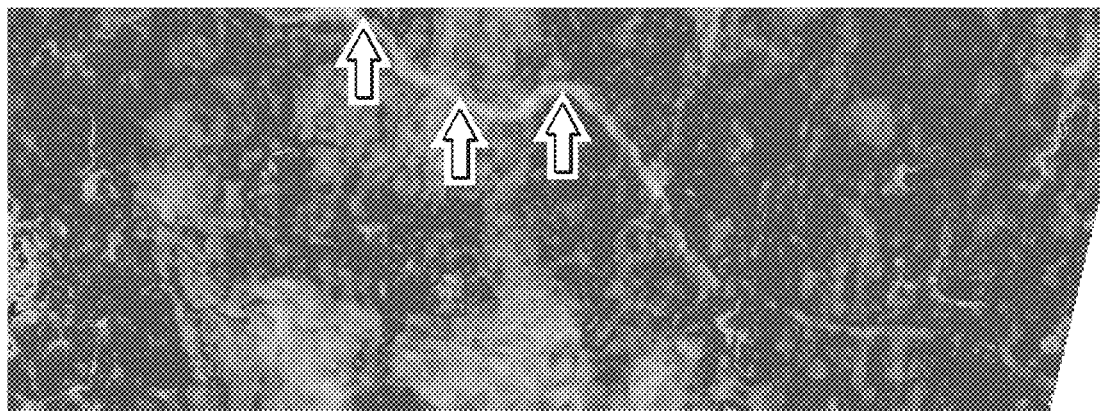
Figure 10:
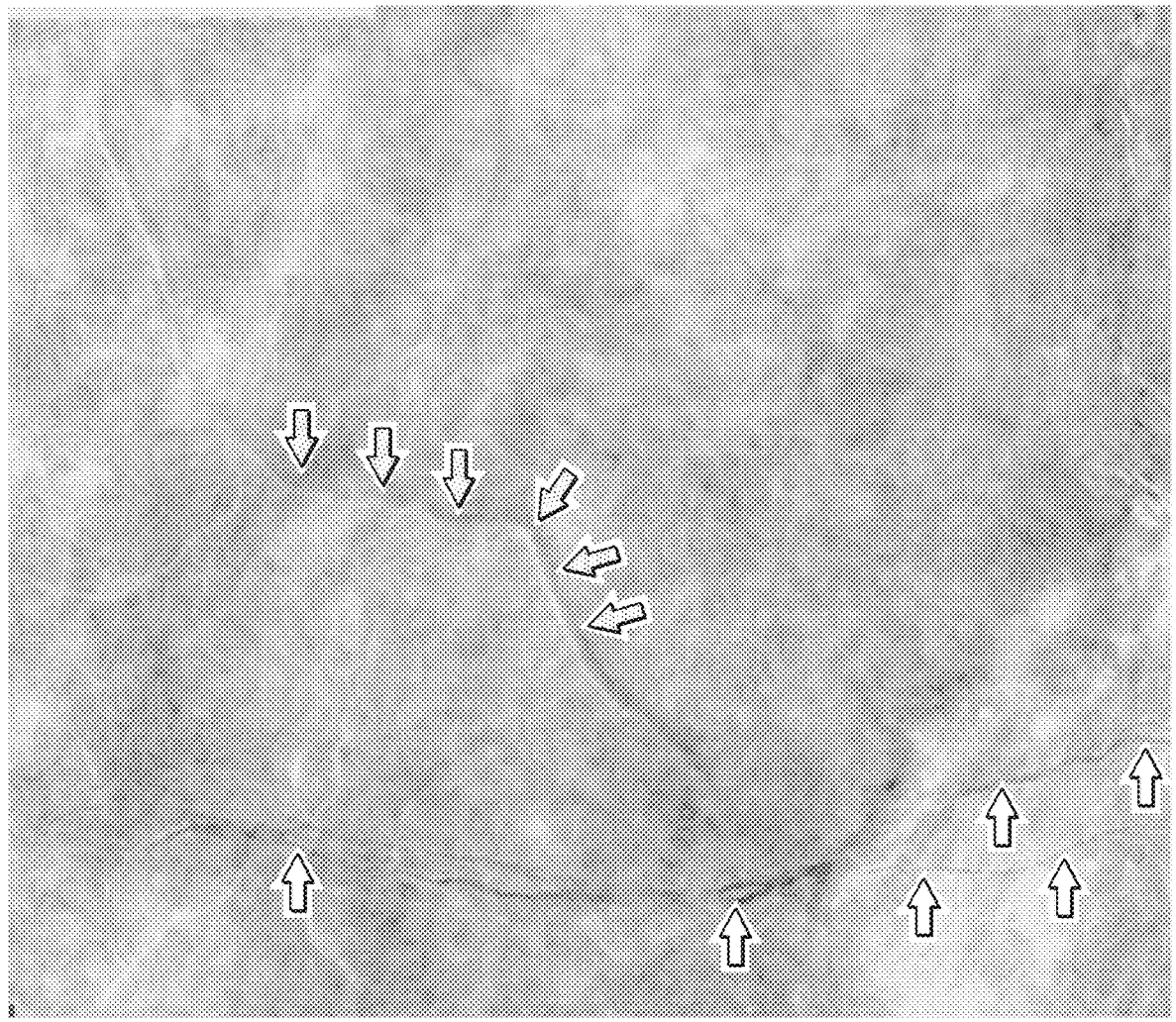
FIGS. 10 and 11 depict example attribute results.
Figure 10:

The second use is to use the output map to highlight stratigraphic and dispositional features such as channels and faults. In the many examples we have run, the invention sometimes shows features that are not previously visible or produce a better image of features that are hardly visible using other techniques from prior art. The detectability chances of these features increases and make it easier for the interpreter to find and map them. Several examples on real data are provided next. In FIG. 9A-C, the channel is most visible and continuous on the map (9C) compared to original seismic data (9A) or in the spectral decomposition technique which is the most common technique used in the art for the purpose of channel detection (9B). This attribute also can be used to map and detect faults. FIG. 10 shows both channels and faults highlighted on the map generated by this invention when run on real data. Stratigraphic and depositional features are detected because this process detects subtle variations in the seismic wavelets, which could arise from such depositional features.

The third use is to use the map to find locations similar to a known location. This works by selected the wavelet at a known location as a reference wavelet instead of computing the mean as a reference wavelet. Then each other location is compared to this reference location resulting in a map that tells the interpreter how different each location is from this known location selected by him/her. If a location is known to the interpreter to be a good location (for example there is a well that has good reservoir properties at that location), then the interpreter is able to choose that location as a reference and produces a map that will tell him/her which other locations are similar to this good location. They are able to use the map to propose other good locations to drill. An interpreter may use a known bad location (for example the location of an existing well that was a failure due to bad reservoir properties) to create a map to know locations to avoid drilling.

FIG. 5 depicts a flow diagram of an example process 500 employed to generate a 3D volume attribute according implementations of the present disclosure. The example process 500 is similar to process 100 depicted in FIG. 1. The select attribute parameters step 502 includes steps 503, 506, and 508 and is substantially similar to the select attribute parameters step 102 of FIG. 1. The wavelets length is determined at 506 (similar to step 106) and a parameter reference is selected as (a) for a weight function at 508 (similar to step 108). At 503, however, the input seismic cube is flattened on the surface of interest. Once the cube is flattened then every horizontal 2D slice on the cube can be considered as a 2D surface along which the algorithm is run. In some implementations, there is no need for a surface selection for process 500 (step 104 of FIG. 1). Each horizontal slice in the input cube (510) is proved as input to the attribute computation step 110 of FIG. 1 to generate a corresponding 2D slice. Repeating for all horizontal slices in the input cube, a 3D volume attribute is generated as output. This part (shown in FIG. 5) describes a way of extending the process from producing 2D surface attribute maps as its final output (FIG. 1, which has its uses) to producing a 3D volume as 3D volume attribute (FIG. 5, which also has its uses). The invention can produce 3D volumes as output by flattening the original cube on the surface of interest then taking the 2D slices that compose the flattened 3D input cube one by one producing 2D slice each time then combining all the 2D slices to produce the final output as a 3D cube. FIG. 5 shows a flowchart of this. In some implementation, the generate weight function step 115 can be implemented once and used for each horizontal slice in the input cube. At 530, the 3D volume attribute may be employed to evaluate the depositional features above and below the surface of interest.

The 3D volume can allow the interpreter to examine and explore the depositional features above and below the surface of interest not only on the surface and make it possible to look for these features in 3D space not only as a 2D map. The likelihood of discovering those features that do not happen exactly on the surface but just above or below it are increased. This way an interpreter can be able to explore a sizable 3D volume of data for these features not only a 2D slice. For example, if a channel is present above or below the surface of interest the interpreter will still be able to discover it using a 3D output even though the channel is not on the surface of interest. The use cases are similar to the 2D attribute map. The interpretation of the result 3D is the same as that of 2D but in 3D space.

The provided surface attribute map may also be used in practice with real field data to provide valuable information about stratigraphic features (See e.g., FIGS. 6A-11). For example, FIGS. 6A-E, 7A-E, and 8A-B depicts examples of how using the generated surface attribute provides a way of assessing surface pick quality. Likewise, FIGS. 9A-C depicts how clear the information provided by the generated surface attribute while FIGS. 10 and 11 how the surface attribute results are useful in detecting stratigraphic features, such as channels and faults and highlights subtle stratigraphic features that may not have been previously visible respectively.

FIG. 6A shows the attribute results for a good pick example as viewed from a map (top view) where the results are color coded according to their values. In this figure, the color is more or less uniform (meaning a good pick, which will be explained in the histogram figure) but not exactly constant where variations are important and correspond to some geological features (faults and channels are visible in this figure). The red line going across the picture from left to right shows the location of the cross-section view that will be described shortly. FIG. 6B is the same as 6A but showing a north south line which is the second cross-section view. FIG. 6C shows the actual pick (not the attribute) as seen on a seismic cube East-West cross-section view. The purpose of this figure is to show that the pick is actually following the seismic very well which means it is a good pick. FIG. 6D shows the pick on North-South cross-section view. FIG. 6E shows the attribute values in a histogram plot. The purpose of this figure is to show the distribution of output values in the case of a good quality pick. In this histogram, there is no negative values and all values are centered on 1.0. The value of 1 indicates that the current wavelet is exactly the same as the reference wavelet. It is expected for a good pick that the values all be positive and close to 1. Negative values mean current pick is not consistent with reference wavelet. The spike at zero indicates missing values. It is concluded from this histogram that the pick is good because there are no appreciable number of negative values and most of the values are centered on 1. The same conclusion can be arrived at from FIG. 6A because the color is almost constant and positive everywhere.

Figure 7E:
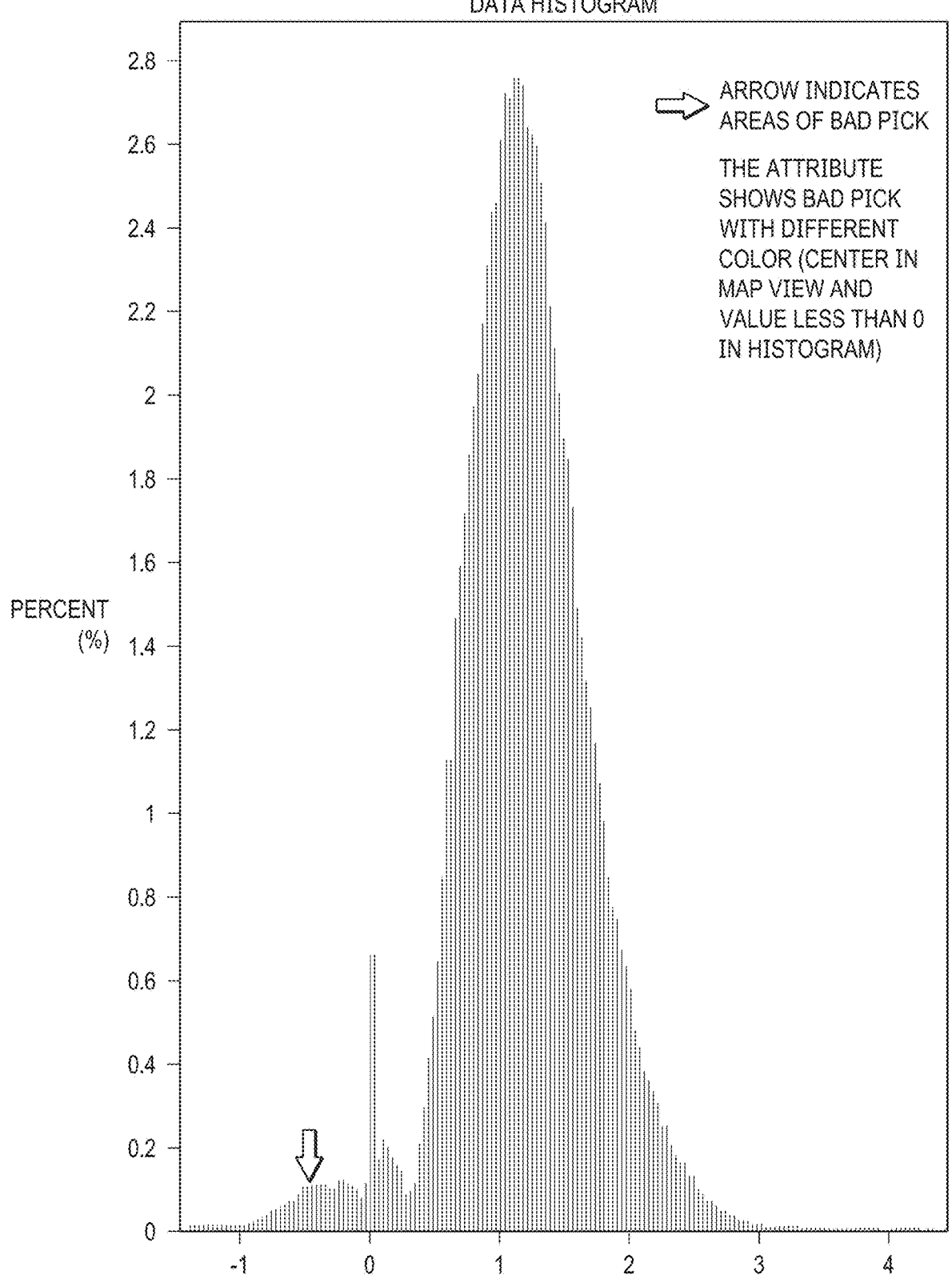

FIG. 7A shows the attribute results for a bad pick example as viewed from a map (top view) where the results are color coded according to their values. In this figure the values are positive except inside a batch at the center where the values are negative indicating a bad pick (which will be explained in the histogram figure). The red line going across the picture from left to right shows the location of the cross-section view that will be described shortly. FIG. 7B is the same as 7A but showing a north south line which is the second cross-section view. FIG. 7C shows the actual pick (not the attribute) as seen on a seismic cube East-West cross-section view. The purpose of this figure is to show that the pick is not following the seismic inside the badly picked. FIG. 7D is showing the pick on North-South cross-section view. FIG. 7E is shown the attribute values in a histogram plot. The purpose of this figure is to show the distribution of output values in the case of a low quality pick. In this histogram there is appreciable number of negative values but most other values are centered on 1.0. The value of 1 indicates that the current wavelet is exactly the same as the reference wavelet. Negative values mean current pick is not consistent with reference wavelet. The spike at zero indicates missing values. It is concluded from this histogram that the pick is not good quality because there are appreciable number of negative values. The same conclusion can be arrived at from FIG. 7A because the color is showing abnormal batch at the center.

Figure 8A:
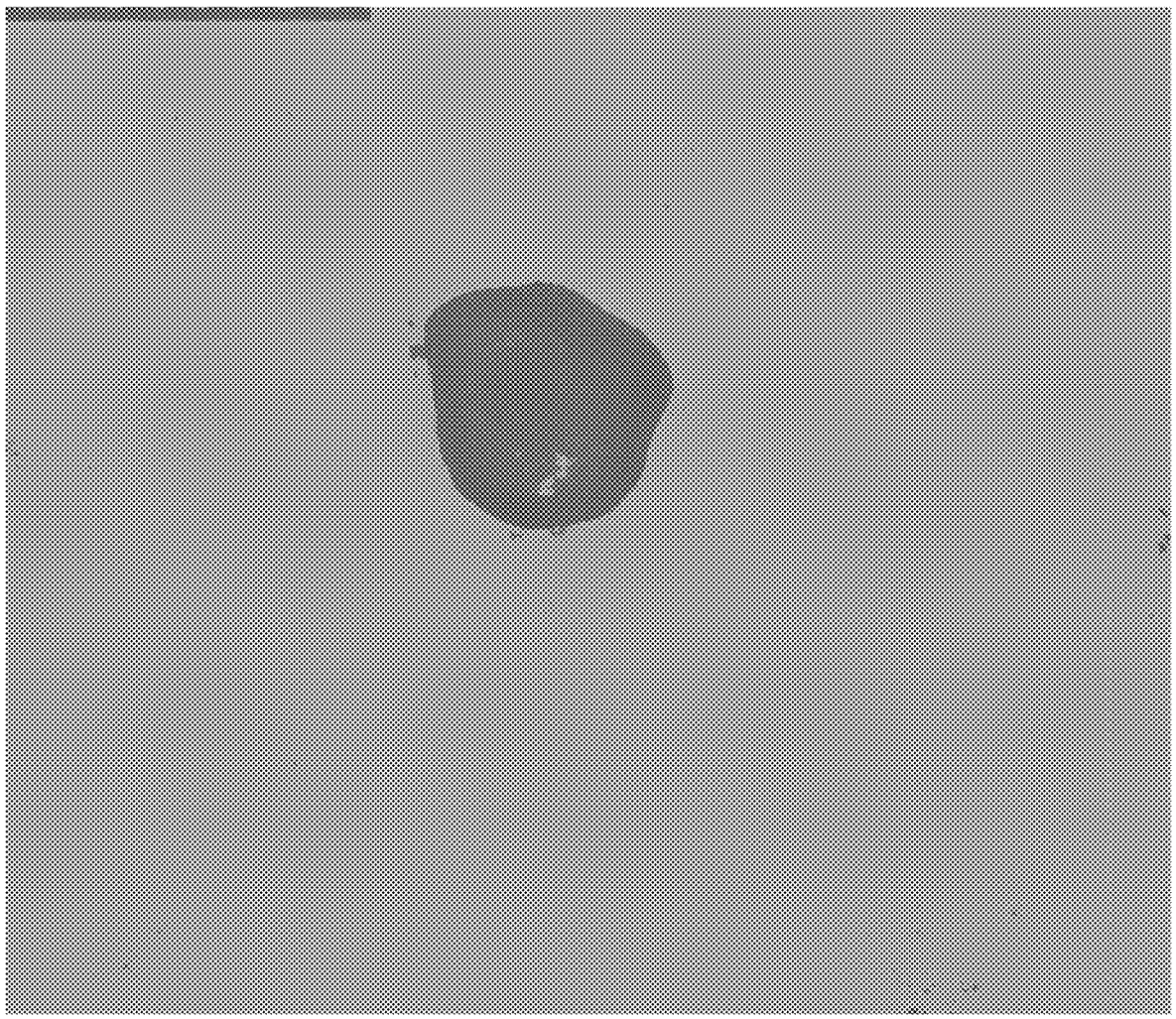
FIG. 8A depicts an example attribute result in map view.
Figure 8B:
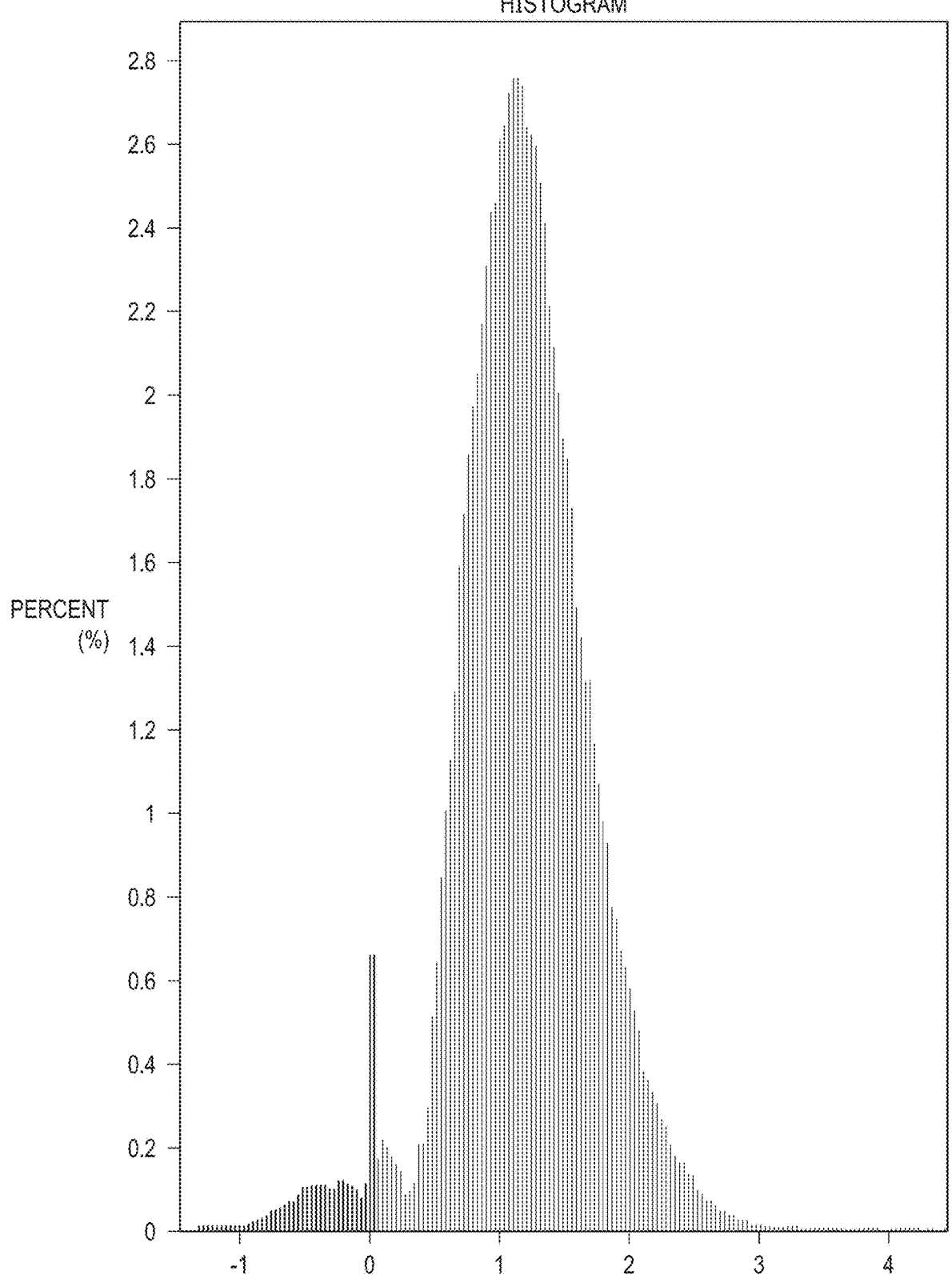
FIG. 8B depicts a histogram.

FIG. 8A shows how to highlight the locations of bad picks automatically by coloring the values above zero and below zeros of this attribute by two different colors. This picture shows a map view of the result when this is done. This can be used by the interpreter to locate bad picks and possibly correct them or make sure he/she takes this into account when making conclusions or decisions. FIG. 8B shows the histogram which a plot showing the distribution of the attribute values and their percentages. This figure shows how the coloring is done around zero.

FIGS. 9A-9C depicts example slice data 900, 920, and 940 respectively. The examples demonstrate how the describe system may be useful in detecting stratigraphic features, such as channels. Example slice 900 shows the original seismic amplitude, which barely shows the channel. The channel is not continuous and hard to distinguish and delineate in all areas. Example slice 920, shows spectral decomposition, which is the industry standard and mostly used attribute to detect channels. It shows the channel, but the channel is not continuous. Example slice 940 is an example output of the described system. As depicted in example slice 940, the channel is continuous and shows nicely with crisp and vivid edges. The example 940 shows how an interpreter can tell the difference by just viewing the attribute when, for example, an abrupt change in wavelets happen as it could be because of bad pick (first example, FIG. 7A) or a change in geology (this example, FIG. 9C).

The output surface attributed map from the described system highlights locations with similar geological features as depicted in FIGS. 10 and 11. In the depicted examples 1000 and 1100, the reference wavelet for selected as any one wavelet in the population of wavelets instead of the mean wavelet of the population. As such the result provide a way of highlighting locations with geological features similar to the location of the chosen wavelet. These example output may be useful in, for example, seismic exploration, but the interpretation of the result may be different. For example, a wavelet can be selected as a reference wavelet from the population because it coincides with the location of a well. In this case, the resulting map may provide information about the degree of similarity of all locations to this wavelet location, which also includes the location of the well. Because the well is known and the characteristics of earth formations at this well is known, then the interpreter can associate or interpret similar result to this wavelet as having similar geological formation to the formations at the known well. If the reservoir at this well, for example, has very good properties then the interpreter might suggest drilling more wells on similar locations. Also, if the reservoir at this well has undesirable characteristics, then the interpreter might want to avoid drilling more wells at similar locations as comported by this attribute.

FIG. 10 depicts an example attribute result 1000. The example attribute result 1000 may be useful in detecting stratigraphic features, such as channels and faults. The example result 1000 above shows very uniform values everywhere (values around one) however, there are slight changes from one place to another. Changes in the wavelets in this case indicates changes in the geology. Examining these changes reveal that they are caused by faults and channels as indicated in the figure. FIG. 11 depicts an example attribute result 1100 when a particular wavelet in the population is chosen as reference wavelet and when the reference wavelet is chosen at a particular location (e.g., a location coinciding with a well).

FIG. 12 depicts a flow diagram of an example process 1200 to generate a custom seismic surface and volume attribute that can be employed in seismic exploration for hydrocarbons.

At 1202, a seismic cube and a seismic surface is received, and the seismic cube includes traces recorded at receivers deployed to collect seismic data. Next at 1204, the seismic surface is picked on the seismic cube. Seismic wavelets are extracted, step 1206, with a selected length from the seismic cube along an intersection with the seismic surface for each spatial coordinate associated with the seismic surface. At 1208, a reference wavelet is determined. Next at step 1210, a surface attribute map is generated based on comparing each of the seismic wavelets to the reference wavelet. At 1212, a productivity of the seismic surface is evaluated using the surface attribute map.

Figure 13:
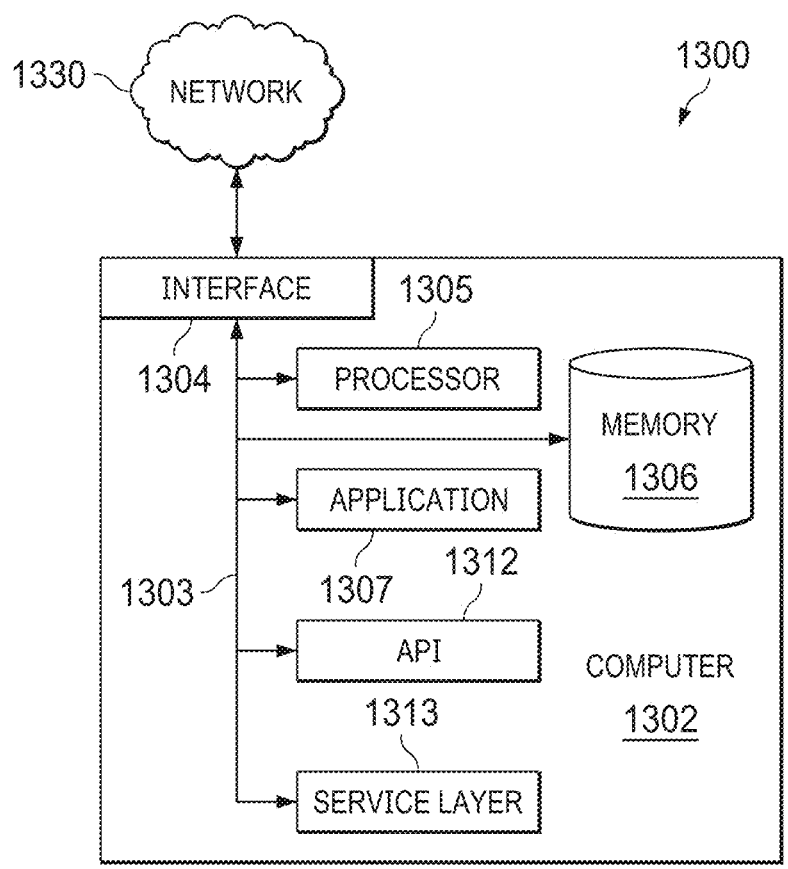
FIG. 13 depicts a block diagram of an exemplary computer system used to provide computational functionalities associated with described algorithms, methods, functions, processes, flows, and procedures as described in the instant disclosure, according to an implementation.

FIG. 13 depicts a block diagram of an exemplary computer system 1300 used to provide computational functionalities associated with described algorithms, methods, functions, processes, flows, and procedures as described in the instant disclosure, according to an implementation. The illustrated computer 1302 is intended to encompass any computing device such as a server, desktop computer, laptop or notebook computer, wireless data port, smart phone, personal data assistant (PDA), tablet computing device, or one or more processors within these devices, including both physical or virtual instances (or both) of the computing device. Additionally, the computer 1302 may comprise a computer that includes an input device, such as a keypad, keyboard, touch screen, or other device that can accept user information, and an output device that conveys information associated with the operation of the computer 1302, including digital data, visual, or audio information (or a combination of information), or a GUI.

The computer 1302 can serve in a role as a client, network component, a server, a database or other persistency, or any other component (or a combination of roles) of a computer system for performing the subject matter described in the instant disclosure. The illustrated computer 1302 is communicably coupled with a network 1330. In some implementations, one or more components of the computer 1302 may be configured to operate within environments, including cloud-computing-based, local, global, or a combination of environments.

At a high level, the computer 1302 is an electronic computing device operable to receive, transmit, process, store, or manage data and information associated with the described subject matter. According to some implementations, the computer 1302 may also include or be communicably coupled with an application server, e-mail server, web server, caching server, streaming data server, business intelligence (BI) server, or other server (or a combination of servers).

The computer 1302 can receive requests over network 1330 from a client application (for example, executing on another computer 1302) and responding to the received requests by processing the said requests in a software application. In addition, requests may also be sent to the computer 1302 from internal users (for example, from a command console or by other access method), external or third parties, other automated applications, as well as any other entities, individuals, systems, or computers.

Each of the components of the computer 1302 can communicate using a system bus 1303. In some implementations, any or all of the components of the computer 1302, both hardware or software (or a combination of hardware and software), may interface with each other or the interface 1304 (or a combination of both) over the system bus 1303 using an application programming interface (API) 1312 or a service layer 1313 (or a combination of the API 1312 and service layer 1313). The API 1312 may include specifications for routines, data structures, and object classes. The API 1312 may be either computer-language independent or dependent and refer to a complete interface, a single function, or even a set of APIs. The service layer 1313 provides software services to the computer 1302 or other components (whether or not illustrated) that are communicably coupled to the computer 1302. The functionality of the computer 1302 may be accessible for all service consumers using this service layer. Software services, such as those provided by the service layer 1313, provide reusable, defined business functionalities through a defined interface. For example, the interface may be software written in JAVA, C++, or other suitable language providing data in extensible markup language (XML) format or other suitable format. While illustrated as an integrated component of the computer 1302, alternative implementations may illustrate the API 1312 or the service layer 1313 as stand-alone components in relation to other components of the computer 1302 or other components (whether or not illustrated) that are communicably coupled to the computer 1302. Moreover, any or all parts of the API 1312 or the service layer 1313 may be implemented as child or sub-modules of another software module, enterprise application, or hardware module without departing from the scope of this disclosure.

The computer 1302 includes an interface 1304. Although illustrated as a single interface 1304 in FIG. 13, two or more interfaces 1304 may be used according to particular needs, desires, or particular implementations of the computer 1302. The interface 1304 is used by the computer 1302 for communicating with other systems in a distributed environment that are connected to the network 1330 (whether illustrated or not). Generally, the interface 1304 comprises logic encoded in software or hardware (or a combination of software and hardware) and operable to communicate with the network 1330. More specifically, the interface 1304 may comprise software supporting one or more communication protocols associated with communications such that the network 1330 or interface's hardware is operable to communicate physical signals within and outside of the illustrated computer 1302.

The computer 1302 includes a processor 1305. Although illustrated as a single processor 1305 in FIG. 13, two or more processors may be used according to particular needs, desires, or particular implementations of the computer 1302. Generally, the processor 1305 executes instructions and manipulates data to perform the operations of the computer 1302 and any algorithms, methods, functions, processes, flows, and procedures as described in the instant disclosure.

The computer 1302 also includes a memory 1306 that holds data for the computer 1302 or other components (or a combination of both) that can be connected to the network 1330 (whether illustrated or not). For example, memory 1306 can be a database storing data consistent with this disclosure. Although illustrated as a single memory 1306 in FIG. 13, two or more memories may be used according to particular needs, desires, or particular implementations of the computer 1302 and the described functionality. While memory 1306 is illustrated as an integral component of the computer 1302, in alternative implementations, memory 1306 can be external to the computer 1302.

The application 1307 is an algorithmic software engine providing functionality according to particular needs, desires, or particular implementations of the computer 1302, particularly with respect to functionality described in this disclosure. For example, application 1307 can serve as one or more components, modules, or applications. Further, although illustrated as a single application 1307, the application 1307 may be implemented as multiple applications 1307 on the computer 1302. In addition, although illustrated as integral to the computer 1302, in alternative implementations, the application 1307 can be external to the computer 1302.

There may be any number of computers 1302 associated with, or external to, a computer system containing computer 1302, each computer 1302 communicating over network 1330. Further, the term "client," "user," and other terminology may be used interchangeably as without departing from the scope of this disclosure. Moreover, this disclosure contemplates that many users may use one computer 1302, or that one user may use multiple computers 1302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data. Such devices can include, for example, a programmable processor, a computer, or multiple processors or computers. The apparatus can also be or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, or libraries. Conversely, the features and functionality of various components can be combined into single components.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and compact disc read-only memory (CD-ROM), Digital Versatile Disc (DVD)+/−R, DVD-RAM, and DVD-ROM disks. The memory may store various objects or data, including caches, classes, frameworks, applications, backup data, jobs, web pages, web page templates, database tables, repositories storing dynamic information, and any other information including any parameters, variables, algorithms, instructions, rules, constraints, or references thereto. Additionally, the memory may include any other data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), Light Emitting Diode (LED), or plasma monitor, for displaying information to the user and a keyboard and a pointing device, for example, a mouse, trackball, or trackpad, by which the user can provide input to the computer. Input may also be provided to the computer using a touch-screen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term graphical user interface (GUI) may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an API or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of the described system or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described earlier as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed.

Moreover, the separation or integration of various system modules and components in the implementations described earlier should not be understood as requiring such separation or integration in all implementations, and it should be understood that the described program components and systems can generally be integrated together in a single software product or packaged into multiple software products.

Accordingly, the earlier description of example implementations does not define or constrain this disclosure. Other changes, substitutions, and alterations are also possible without departing from the spirit and scope of this disclosure.

Furthermore, any claimed implementation described later is considered to be applicable to at least a computer-implemented method, a non-transitory, computer-readable medium storing computer-readable instructions to perform the computer-implemented method, and a computer system comprising a computer memory interoperably coupled with a hardware processor configured to perform the computer-implemented method or the instructions stored on the non-transitory, computer-readable medium.

What is claimed is:

1. A computer-implemented method for evaluating productivity, comprising:
  receiving a seismic cube and a seismic surface, wherein the seismic cube includes traces recorded at receivers deployed to collect seismic data, and the seismic surface is picked on the seismic cube;
  extracting, from the seismic cube, seismic wavelets with a wavelet length along an intersection of the seismic cube with the seismic surface for each spatial coordinate associated with the seismic surface, each seismic wavelet comprising a plurality of samples;
  calculating a respective weight to apply to each of the plurality of samples of each seismic wavelet, wherein the respective weight for each sample is calculated as:

$$\text{weight} = e^{-\frac{d^2}{2v}},$$

where d=|index of current sample−1−number of samples above the current sample|, where $$v = -\frac{N^2}{2\ln(\alpha)},$$

where N=max(samples above the current sample·samples below the current sample), and where α is a parameter reference;
  applying the respective weight to each sample to generate weighted seismic wavelets;
  determining a reference wavelet;
  generating a three-dimensional (3D) surface attribute map based on comparing each of the weighted seismic wavelets to the reference wavelet; and
  evaluating a productivity of the seismic surface using the 3D surface attribute map.

2. The computer-implemented method of claim 1, further comprising, before extracting the seismic wavelets, determining the wavelet length for the selected seismic cube, wherein the wavelet length represents a number of the plurality of samples in each of the seismic wavelets.

3. The computer-implemented method of claim 2, wherein the wavelet length is the same for all of the seismic wavelets.

4. The computer-implemented method of claim 1, wherein the parameter reference ranges from 0.1 to 0.99.

5. The computer-implemented method of claim 1, wherein the reference wavelet is determined as a mean of the seismic wavelets.

6. The computer-implemented method of claim 1, wherein the reference wavelet is determined as the median of the seismic wavelets.

7. The computer-implemented method of claim 1, wherein the reference wavelet is manually selected from the seismic wavelets.

8. One or more non-transitory computer-readable storage media coupled to one or more processors and having instructions stored thereon which, when executed by the one or more processors, cause the one or more processors to:
  receive a seismic cube and a seismic surface, wherein the seismic cube includes traces recorded at receivers deployed to collect seismic data, and the seismic surface is picked on the seismic cube;
  extract, from the seismic cube, seismic wavelets with a wavelet length along an intersection of the seismic cube with the seismic surface for each spatial coordinate associated with the seismic surface, each seismic wavelet comprising a plurality of samples;
  calculate a respective weight to apply to each of the plurality of samples of each seismic wavelet, wherein the respective weight for each sample is calculated as:

$$\text{weight} = e^{-\frac{d^2}{2v}},$$

where d=|index of current sample−1−number of samples above the current sample|, where $$v = -\frac{N^2}{2\ln(\alpha)},$$

where N=max(samples above the current sample·samples below the current sample), and where α is a parameter reference;
  apply the respective weight to each sample to generate weighted seismic wavelets;
  determining a reference wavelet;

generate a three-dimensional (3D) surface attribute map based on comparing each of the weighted seismic wavelets to the reference wavelet; and evaluate a productivity of the seismic surface using the 3D surface attribute map.

9. The computer-readable storage media of claim 8, the instructions further comprising, before extracting the seismic wavelets, determining the wavelet length for the selected seismic cube, wherein the wavelet length represents a number of genes in each of the seismic wavelets.

10. The computer-readable storage media of claim 9, wherein the wavelet length is the same for all of the seismic wavelets.

11. The computer-readable storage media of claim 8, wherein the parameter reference ranges from 0.1 to 0.99.

12. The computer-readable storage media of claim 8, wherein the reference wavelet is determined as a mean of the seismic wavelets.

13. The computer-readable storage media of claim 8, wherein the reference wavelet is determined as the median of the extracted wavelets.

14. A system, comprising:

one or more processors; and a computer-readable storage device coupled to the one or more processors and having instructions stored thereon which, when executed by the one or more processors, cause the one or more processors to:

receive a seismic cube and a seismic surface, wherein the seismic cube includes traces recorded at receivers deployed to collect seismic data, and the seismic surface is picked on the seismic cube;

extract, from the seismic cube, seismic wavelets with a wavelet length along an intersection of the seismic cube with the seismic surface for each spatial coordinate associated with the seismic surface, each seismic wavelet comprising a plurality of samples;

calculate a respective weight to apply to each of the plurality of samples of each seismic wavelet, wherein the respective weight for each sample is calculated as:

$$\text{weight} = e^{-\frac{d^2}{2v}},$$

where d=|index of current sample−1−number of samples above the current sample|, where $$v = -\frac{N^2}{2\ln(\alpha)},$$

where N=max(samples above the current sample·samples below the current sample), and where α is a parameter reference;

apply the respective weight to each sample to generate weighted seismic wavelets;

determining a reference wavelet;

generate a three-dimensional (3D) surface attribute map based on comparing each of the weighted seismic wavelets to the reference wavelet; and evaluate a productivity of the seismic surface using the 3D surface attribute map.

15. The system of claim 14, the instructions further comprising, before extracting the seismic wavelets, determining the wavelet length for the selected seismic cube, wherein the wavelet length represents a number of genes in each of the seismic wavelets.

* * * * *